(12) United States Patent
Mathy

(10) Patent No.: US 11,965,962 B2
(45) Date of Patent: Apr. 23, 2024

(54) RESOLVING MULTI-PATH CORRUPTION OF TIME-OF-FLIGHT DEPTH IMAGES

(71) Applicant: Analog Devices, Inc., Norwood, MA (US)

(72) Inventor: Charles Mathy, Arlington, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 684 days.

(21) Appl. No.: 16/706,041

(22) Filed: Dec. 6, 2019

(65) Prior Publication Data
US 2020/0249348 A1 Aug. 6, 2020

Related U.S. Application Data

(60) Provisional application No. 62/800,968, filed on Feb. 4, 2019.

(51) Int. Cl.
*G01S 17/08* (2006.01)
*G06T 7/50* (2017.01)
*H04N 13/207* (2018.01)

(52) U.S. Cl.
CPC ............. *G01S 17/08* (2013.01); *G06T 7/50* (2017.01); *H04N 13/207* (2018.05); *G06T 2207/10028* (2013.01)

(58) Field of Classification Search
CPC . G01S 17/08; G06T 7/50; G06T 2207/10028; H04N 13/207
See application file for complete search history.

(56) References Cited

U.S. PATENT DOCUMENTS

| | | | |
|---|---|---|---|
| 2008/0243430 A1 | 10/2008 | Weilenmann | |
| 2009/0033931 A1* | 2/2009 | Murtagh | G01N 21/1717 356/317 |
| 2015/0253429 A1* | 9/2015 | Dorrington | G01S 7/4815 356/5.01 |
| 2016/0299218 A1* | 10/2016 | Lehmann | G01S 7/4911 |
| 2018/0106891 A1* | 4/2018 | Thurner | G01S 7/497 |

(Continued)

FOREIGN PATENT DOCUMENTS

| | | |
|---|---|---|
| CN | 105518480 A | 4/2016 |
| CN | 105899969 A | 8/2016 |

(Continued)

OTHER PUBLICATIONS

Bhandari et al., *Resolving Mutlipath Interference in Kinect: An Inverse Problem Approach* 978-1-4799-0162-3, © 2014 IEEE, 4 pages.

(Continued)

*Primary Examiner* — Sing-Wai Wu
*Assistant Examiner* — Khoa Vu
(74) *Attorney, Agent, or Firm* — ArentFox Schiff LLP

(57) ABSTRACT

Time of Flight (ToF) depth image processing methods are disclosed for resolving corruption of ToF depth images. In ToF depth imaging, the light can travel paths of different lengths before returning to the pixel. Thus, the light hitting the pixel can have travelled different distances, and the distance obtained from an estimation procedure assuming a single distance may be spurious. Systems and methods are disclosed for including a time-of-flight imager and processor which resolves the multiple paths, and outputs the multiple depths at each pixel.

18 Claims, 15 Drawing Sheets

(56) References Cited

U.S. PATENT DOCUMENTS

2018/0139398 A1* 5/2018 Kovacovsky ........... G01S 17/89
2018/0278910 A1* 9/2018 Schoenberg ............ G01S 11/00
2019/0154439 A1* 5/2019 Binder ................... G01B 11/26
2019/0174123 A1* 6/2019 Munro ..................... G06T 7/55
2020/0049492 A1* 2/2020 Kim ....................... G09G 3/006

FOREIGN PATENT DOCUMENTS

CN          106017479 A     10/2016
CN          107255794 A     10/2017

OTHER PUBLICATIONS

Kirmani et al., *Spumic: Simultaneous Phase Unwrapping and Multipath Interference Cancellation in Time-of-Flight Cameras Using Spectral Methods*, IEEE International Conference on Multimedia & Expo (ICME), Jul. 2013, 6 pages.
Bhandari et al., *Resolving Multi-path Interference in Time-of-Flight Imaging via Modulation Frequency Diversity and Sparse Regularization*, Optics Letters, Apr. 2014, vol. 39, Issue 6, 11 pages.
Office Action in CN202010079369.1, dated Feb. 20, 2023, 10 pages.
Office Action in CN202010079369.1, mailed Sep. 8, 2023, 12 pages.
Xu Zhao et al., Basic theory of coal mine shaft electronic wave propagation and array antenna application (China University of Mining and Technology Press, Dec. 2014).
Zhang Qishan et al., "Bridge function theory and its application" (National Defense Industry Press, Apr. 1992).

* cited by examiner

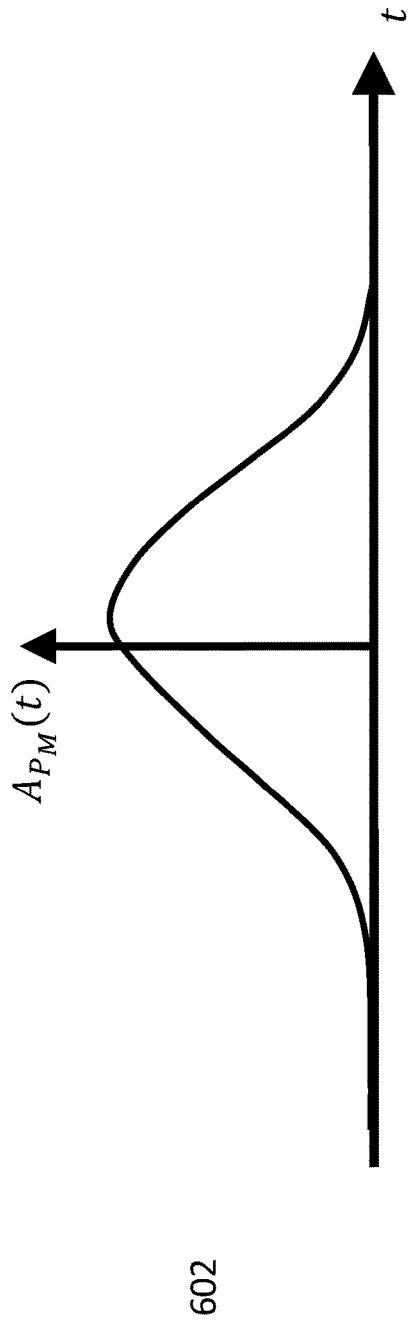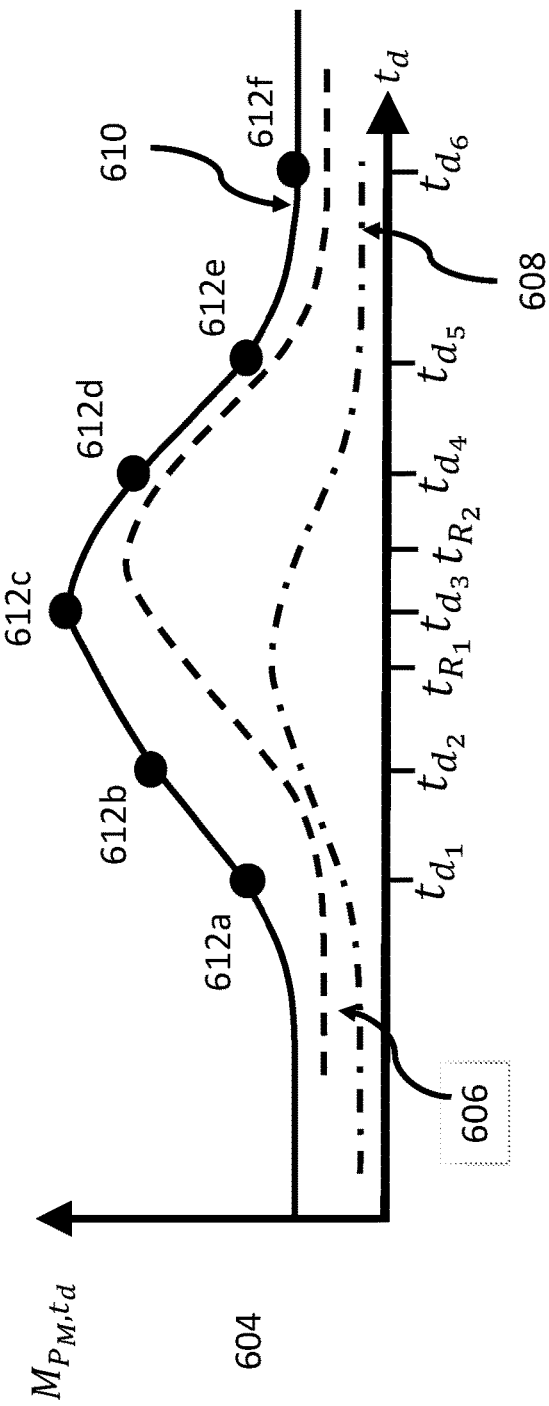

RESOLVING MULTI-PATH CORRUPTION OF TIME-OF-FLIGHT DEPTH IMAGES

CROSS-REFERENCE TO RELATED APPLICATIONS

This application claims the benefit of and priority from U.S. Provisional Patent Application No. 62/800,968 filed 4 Feb. 2019, entitled "RESOLVING MULTI-PATH CORRUPTION OF TIME-OF-FLIGHT IMAGES", incorporated herein by reference in its entirety.

FIELD OF THE DISCLOSURE

The present disclosure pertains to time of flight (ToF) imaging. More specifically, this disclosure describes systems and techniques relating to resolving corruption of ToF depth images.

BACKGROUND

Time of flight (ToF) is a property of an object, particle or acoustic, electromagnetic or other wave. It is the time that such an object needs to travel a distance through a medium. The measurement of this time (i.e. the time of flight) can be used for a time standard (such as an atomic fountain), as a way to measure velocity or path length through a given medium, or as a way to learn about the particle or medium (such as composition or flow rate). The traveling object may be detected directly (e.g., ion detector in mass spectrometry) or indirectly (e.g., light scattered from an object in laser doppler velocimetry).

The Time-of-Flight principle (ToF) is a method for measuring the distance between a sensor and an object based on the time difference between the emission of a signal and its return to the sensor after being reflected by an object. Various types of signals (also called carriers) can be used with ToF, the most common being sound and light. Some sensors use light as their carrier because it is uniquely able to combine speed, range, low weight and eye-safety. Infrared light can ensure less signal disturbance and easier distinction from natural ambient light resulting in the higher performing sensors for a given size and weight.

A time-of-flight camera (ToF camera) is a range imaging camera system that resolves distance based on the known speed of light, measuring the time-of-flight of a light signal between the camera and the subject for each point of the image.

In time-of-flight (TOF) image sensors, the image sensor captures a two-dimensional image, or several two-dimensional images, from which a processor can determine the distance to objects in the scene. The TOF image sensor is further equipped with a light source that illuminates objects whose distances from the device are to be measured by detecting the time it takes the emitted light to return to the image sensor. The system may also utilize image processing techniques.

A depth camera is a camera where each pixel outputs the distance between the camera and the scene. One technique to measure depth is to calculate the time it takes for the light to travel from a light source on the camera to a reflective surface and back to the camera. The time travelled is proportional to the distance to objects. This travel time is commonly referred as time of flight.

One of the biggest challenges in building reliable ToF systems are multipath effects, where the light rays arriving at a pixel have not all travelled the same distance. For example, some light rays may have undergone more than one bounce, which would corrupt the distance estimate. Nearby highly reflective surfaces such as mirrors can lead to strong multipath corruption.

SUMMARY OF THE DISCLOSURE

Systems and methods are presented herein for resolving the multipath effect. One approach to resolving the multipath effect is to increase the number of measurements, for example collecting depth images for the system running at different frequencies, and using the extra measurements to resolve the different multipath bounces. This is typically done assuming that the signals collected by the imager depend sinusoidally on the distance to the objects. Departing from this assumption may in some cases significantly improve the performance of multipath reduction, increase the frame rate and reduce the amount of power required to run the system.

According to one aspect, an image processing system for resolving multi-path corruption includes a light source configured to emit a nonsinusoidal light signal during a first time interval, an image sensor comprising a plurality of pixels, the image sensor configured to collect incoming signals including a first reflected nonsinusoidal light signal and a second reflected nonsinusoidal light signal, and a processor configured to determine a first estimated distance to an object based on the first and second reflected nonsinusoidal light signals, and determine a corrected distance using a look-up table.

According to various implementations, the image sensor is further configured to calculate a first set of measurements of the first and second reflected nonsinusoidal light signals. In some examples, the processor receives the first set of measurements from the imager and processes the first set of measurements to determine a second set of measurements, wherein the second set of measurements is smaller than the first set of measurements. In some examples, the processor performs dimensionality reduction on the first set of measurements to generate the second set of measurements. In some examples, the processor performs discretization on the first set of measurements to generate the second set of measurements. In some examples, discretization includes selecting a discrete set of values from the first set of measurements, and wherein the look-up table stores pre-computed solutions to the discrete set of values.

According to some implementations, the look-up table comprises stored corrected depth data for respective subsets of the first set of measurements. In some implementations, the processor is further configured to undergo a calibration step.

According to another aspect, a method for depth determination in an image to resolve multi-path corruption includes emitting a nonsinusoidal light signal from a light source during a first time interval, receiving first and second reflected nonsinusoidal light signals at an imager array, performing time of flight measurements on the first and second nonsinusoidal light signals to generate a first set of measurements, receiving the first set of measurements at a processor, determining, at the processor, a first estimated distance to an object based on the first set of measurements, and determining a corrected distance based on the first set of measurements using a lookup table.

In some implementations, the method includes generating a second set of measurements using the first set of measurements, wherein the second set of measurements is smaller than the first set of measurements. In some examples, the method includes dimensionality reduction on the first set of measurements to generate the second set of measurements. In some examples, the method includes discretizing the first set of measurements to generate the second set of measurements. In some examples, discretizing the first set of measurements includes selecting a discrete set of values from the first set of measurements, and wherein the look-up table comprises stored precomputed solutions for the discrete set of values.

According to various implementations, the look-up table includes stored corrected depth data for respective subsets of the first set of measurements. In some implementations, the method includes calibrating processor distance measurements.

According to one aspect, an imaging apparatus for resolving multi-path corruption includes a light source configured to emit a nonsinusoidal light signal during a first time interval, an image sensor comprising a plurality of pixels, the image sensor configured to collect incoming signals including a first reflected nonsinusoidal light signal and a second reflected nonsinusoidal light signal, means for determining a first estimated distance to an object based on the first and second reflected nonsinusoidal light signals, and means for determining a corrected distance using a look-up table.

According to some implementations, the imaging apparatus includes means for generating a first set of measurements of the first and second reflected nonsinusoidal light signals. In some implementations, the imaging apparatus includes means for processing the first set of measurements to determine a second set of measurements, wherein the second set of measurements is smaller than the first set of measurements. In some examples, processing the first set of measurements to determine a second set of measurements includes performing dimensionality reduction on the first set of measurements to generate the second set of measurements. In some examples, processing the first set of measurements to determine a second set of measurements includes performing discretization on the first set of measurements to generate the second set of measurements.

In some examples, the means for determining a first estimated distance to an object based on the first and second reflected nonsinusoidal light signals includes one of a processor and an image sensor. In some examples, the means for determining a corrected distance using a look-up table includes one of a processor and an image sensor.

The drawings show exemplary ToF circuits, systems and configurations. Variations of these systems, for example, changing the positions of, adding, or removing certain elements from the circuits are not beyond the scope of the present invention. The illustrated ToF devices and configurations are intended to be complementary to the support found in the detailed description.

Further limitations and disadvantages of conventional and traditional approaches will become apparent to one of skill in the art, through comparison of such systems with some aspects of the present invention as set forth in the remainder of the present application with reference to the drawings.

BRIEF DESCRIPTION OF THE DRAWINGS

For a fuller understanding of the nature and advantages of the present invention, reference is made to the following detailed description of preferred embodiments and in connection with the accompanying drawings, in which:

FIGS. 6A-6B each show a graph demonstrating the multi-path problem, according to some embodiments of the disclosure;

DETAILED DESCRIPTION

Time of flight (ToF) depth imager arrays create images of the distance (i.e. depth) to objects in the scene, by emitting light close to the imager and measuring the time it takes for the light to reflect off objects and return to the imager. The imager contains an array of light-receiving pixels that each convert the number of photons that arrive at the pixel while the pixel is on, to a number that is stored in one of a number of storage units at each pixel. Once the time $t_R$ it takes for the light to leave the light source and return a pixel in the imager is estimated, the depth to the part of the scene viewed by the pixel is given by equation (1):

$$D = \frac{ct_R}{2} \quad (1)$$

where c is the speed of light.

One challenge in building a reliable ToF system is that light rays arriving at a pixel may have travelled different distances. This is referred to as the multipath effect. In particular, referring to Equation (1), the distance D is determined by dividing the time $t_R$ in half, which is based on the assumption that the signal travelled the distance to the object twice—once to reach the object, and then again after reflecting off the object and travelling back to the sensor. However, some light rays may have undergone more than one reflection, which changes the total distance travelled by the light ray, and corrupts the distance estimate. Nearby highly reflective surfaces such as mirrors can lead to strong multipath corruption.

Systems and methods are presented herein for resolving the multipath effect. One approach to resolving the multipath effect is to increase the number of measurements. For example, multiple depth images can be collected, each using a different frequency for the emitted light. The extra measurements can be used to resolve the different multipath bounces. Multipath bounces are resolved and depth determinations are made based on an assumption that the signals collected by the imager depend sinusoidally on the distance to the objects. According to various implementations, systems and methods are presented herein for resolving multipath effects and determining distance based on non-sinusoidal signals. According to various features, using non-sinusoidal signals significantly improves the performance of multipath reduction, increases the frame rate of the system, and reduces the amount of power used to run the system.

Figure 1:
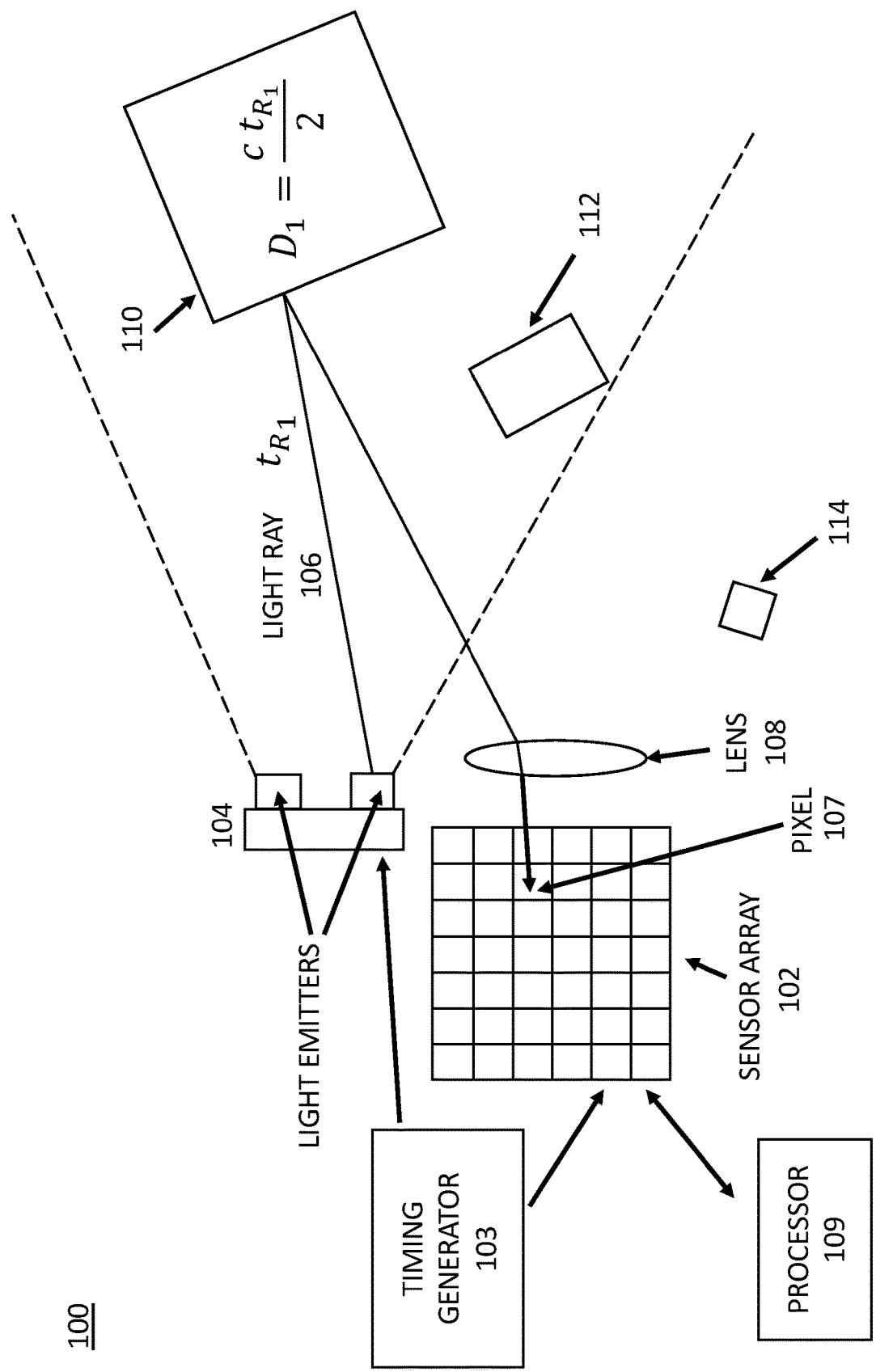
FIG. 1 shows a time-of-flight depth imaging system, according to some embodiments of the disclosure.

FIG. 1 shows a time-of-flight depth imaging system 100, according to some implementations of the disclosure. The imaging system 100 includes light receiving pixels in a sensor array 102, a light emitter or light emitters 104, and a lens 108. As shown in FIG. 1, a light ray 106 leaves a light emitter 104, reflects off a part of an object 110 at a distance $D_1$, and is received at a pixel 107 after a travel time $t_{R_1}$. A processor 109 estimates the travel time $t_{R_1}$ from a series of measurements, and the distance $D_1$ of the part of the scene viewed by the pixel is calculated using equation (1) above. According to various implementations, each pixel in the sensor array has a respective storage unit for storing received signals.

Light reflecting off another object 112 in the scene, or another part of the same object, may return to a different pixel, due to a lens 108 that focuses light from different parts of the scene onto different pixels. According to some examples, an object 114 outside of the field of emission of the light emitters, or outside of the field of view of the imager, may not contribute anything to the pixels.

One problem with ToF depth imaging is the light can travel paths of different lengths before returning to the pixel. Thus, the light hitting the pixel can have travelled different distances $D_i$, and the obtained distance from the estimation procedure assuming a single distance may be spurious.

Because it can be challenging to directly estimate the travel time of photons returning to the imager, time-of-flight imagers typically vary the emitted light intensity as a function of time and integrate the return light over certain time intervals. During the time that the pixels are receiving light, the photon intensity is converted to a number that is stored in one of a number of storage units at each pixel. In some implementations, a timing generator 103 sends signals to the light emitters 104 and the imager array 102, controlling their respective intensity and sensitivity as a function of time. The numbers stored at the storage units can be used by a processor 109 to estimate $t_R$. For example, the number of photons collected can be converted to a voltage, or to a stored charge.

Figure 2:
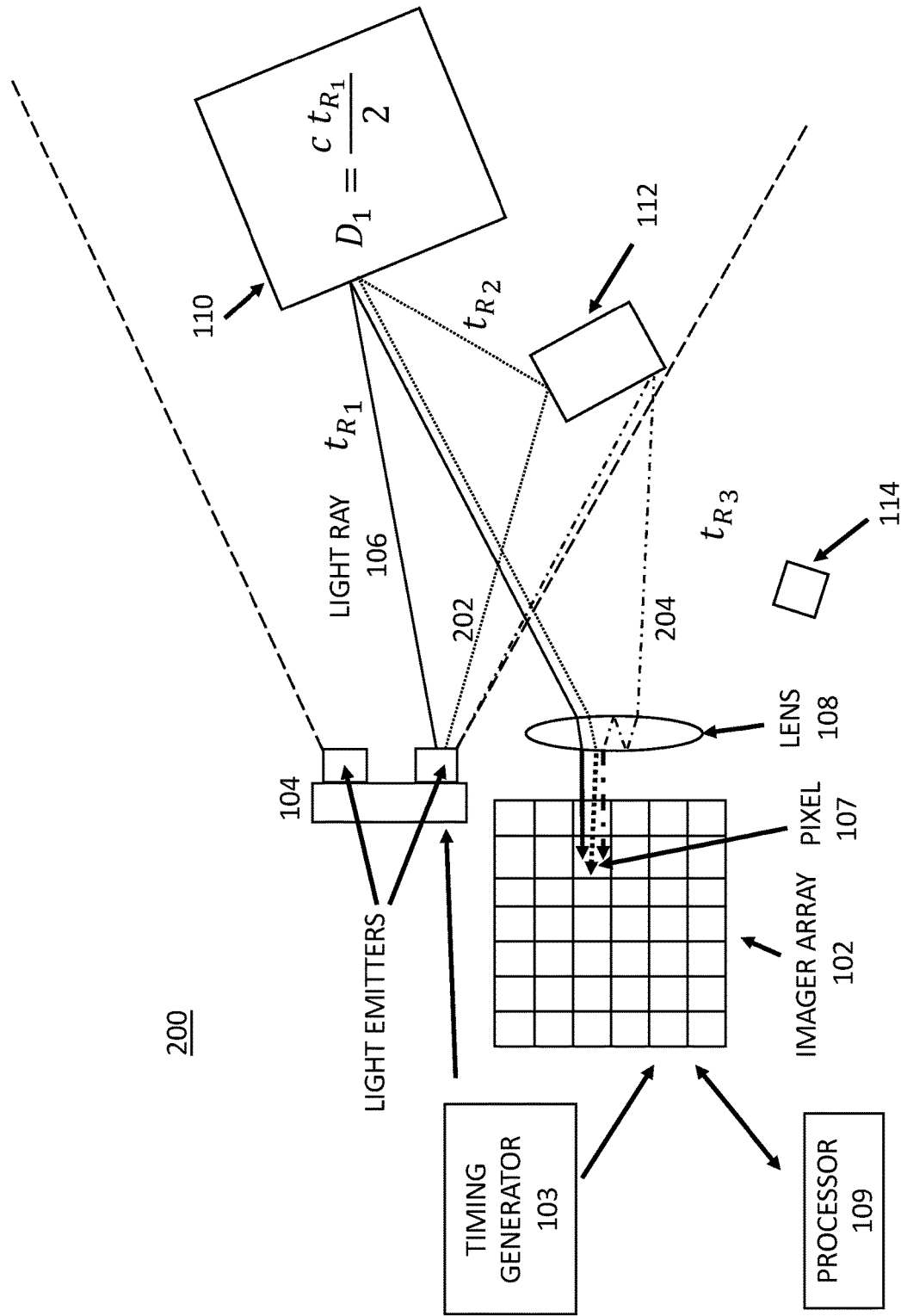
FIG. 2 illustrates examples of the multi-path problem, according to some embodiments of the disclosure.

FIG. 2 illustrates examples of the multi-path problem. Light rays leaving an emitter and arriving at a pixel 107 may have travelled paths with different travel times. Thus, the integrated measurements used by the processor 109 to estimate distance may be corrupted, leading to inaccurate depth estimation. For example, a light ray 202 may bounce off an object 112 and then bounce off the part of object 110 which corresponds to pixel 107, finally returning to pixel 107 after a total travel time $t_{R_2}$. Another light ray 204 may bounce off another part of object 112, enter the lens and undergo internal reflection inside the lens and end up in pixels which do not correspond to that part of object 112, which may include pixel 107. This problem of internal reflection may be especially pronounced for objects close to the imager, as the amount of return light to a pixel typically decreases quadratically with distance. Therefore, nearby objects may lead to relatively intense return light, such that even if the lens 108 is treated and designed so that internal reflection is small, for example by coating it with antireflective coating, the contribution from internal reflection may still be large enough to corrupt depth estimates of pixels.

Figure 3:
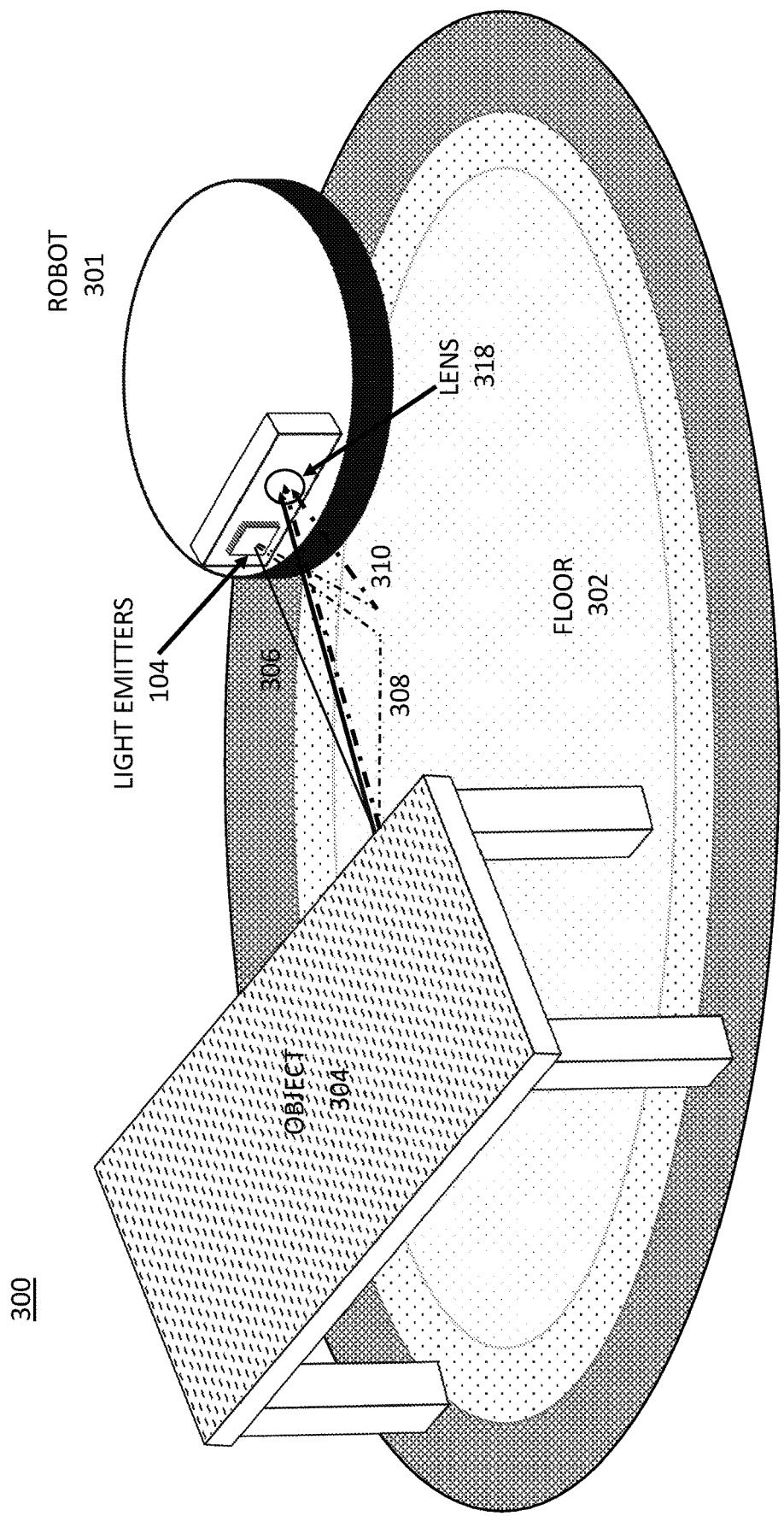
FIG. 3 shows an example of a system with multi-path effects, according to some embodiments of the disclosure.

FIG. 3 shows an example of a system with multi-path effects, according to various embodiments of the disclosure. In particular, the system in FIG. 3 shows a robot 301 moving close to the floor 302. As shown in FIG. 3, a first light ray 306 reflects off a part of an object 304 and returns to a lens 318 in front of a depth imager, arriving at a first pixel with a first travel time. A second light ray 308 bounces off a part of the floor, then hits the same part of the object that the light ray 306 hit, and finally returns to the first pixel but with a second travel time. According to various examples, the second travel time is different from the first travel time.

Furthermore, as shown in FIG. 3, a third light ray 310 bounces off the floor, returns to the lens 318, undergoes internal reflection, and arrives at the first pixel with a third travel time. According to various examples, the third travel time is different from the first travel time, and the third travel time is different from the second travel time. If the system shown in FIG. 3 is only configured to determine a single path, it may report an incorrect distance for the first pixel, due to the varying travel times of the light rays received at the first pixel.

Figure 4:
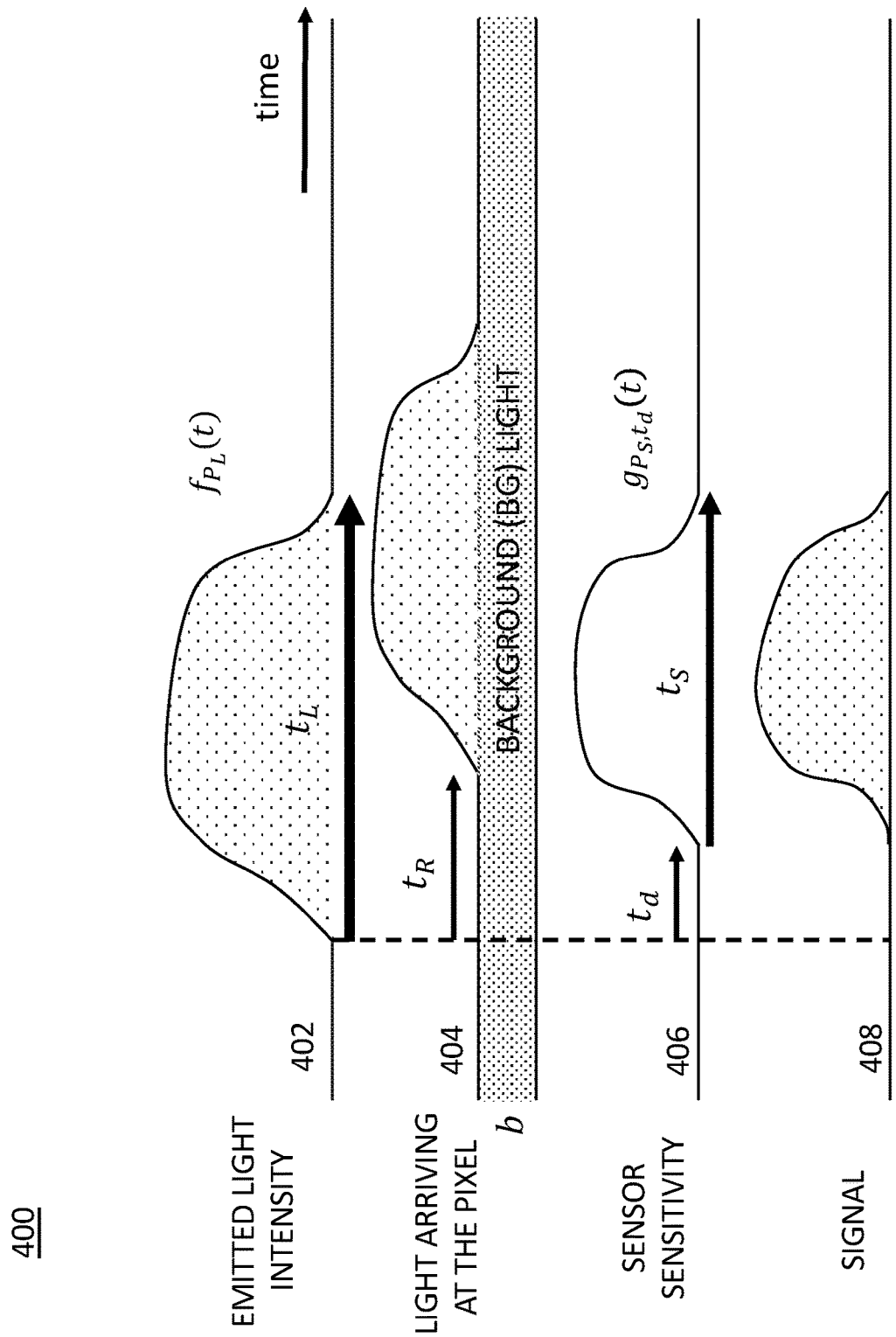
FIG. 4 shows an exemplary measurement of a time-of-flight imager using pulsed operation, according to some embodiments of the disclosure.

FIG. 4 shows an exemplary measurement of a time-of-flight imager using pulsed operation, according to some embodiments of the disclosure. A time-of-flight measurement depends on the intensity 402 of the emitted light as a function of time, as shown in the top graph. The intensity 402 of the emitted light as a function of time is denoted as $f_{P_L}(t)$ where $P_L$ is a set of parameters that the intensity of the light source depends on. For example, $P_L$ may include the time $t_L$ during which the light pulse is on, and $P_L$ may include the temperature $T_L$ of the light emitters.

If a pixel corresponds to a part of the scene with an object at distance $$D = \frac{ct_R}{2},$$

and multi-path effects can be ignored, then the light intensity arriving at the pixel over time will have the functional form shown in equation (2):

$$a_R f_{P_L}(t-t_R)+b_R \qquad (2)$$

where $a_R$ depends on the reflectivity of the part of the scene the pixel is receiving light from, and $b_R$ is the contribution from background light. The quantity $t_R$ is the quantity that the time-of-flight imager estimates.

The second graph shows the light 404 received at the pixel. The light 404 includes background light $b_R$, and background light may include, for example sunlight or other light sources reflecting off the same part of the scene.

The third graph shows the sensitivity 406 of the sensor as a function of time, denoted by $g_{P_S,t_d}(t)$. According to various examples, the measurements depend on sensitivity of the sensor. $t_d$ is a delay time, which denotes a time offset between the emitted light intensity and the sensor sensitivity functions. Since $t_d$ is a simple delay time, the sensitivity of the sensor is represented by equation (3):

$$g_{P_S,t_d}(t) = g_{P_S,0}(t-t_d) \qquad (3)$$

and, this can be denoted:

$$g_{P_S}(t) \equiv g_{P_S,0}(t) \qquad (4)$$

$P_S$ is the set of parameters that the sensitivity of the imager depends on, which may include the temperature $T_S$ of the sensor, or the time $t_S$ during which the sensor has non-negligible sensitivity. The signal 408 over time at the pixel is then given by equation (5):

$$(a_R f_{P_L}(t-t_R) + b_R) g_{P_S,t_d}(t) \qquad (5)$$

Thus, the time-of-flight measurement $M_{P_M,t_d}(t_R, a_R, b_R)$ is represented by equation (6):

$$M_{P_M,t_d}(t_R, a_R, b_R) = \int (a_R f_{P_L}(t-t_R) + b_R) g_{P_S,t_d}(t) dt \qquad (6)$$

The sensor response is approximately linear, and the time-of-flight measurement $M_{P_M,t_d}(t_R, a_R, b_R)$ for a pixel is added to the value currently stored at the respective storage unit currently collecting signal. In some examples, a measurement is repeated a number of times N. Repeating the measurement increases the signal level, and the stored signal becomes $N M_{P_M,t_d}(t_R, a_R, b_R)$. In some examples, since each of the measurements can be noisy, the stored signal $N M_{P_M,t_d}(t_R, a_R, b_R)$ is a sum of N noisy realizations of the time-of-flight measurement $M_{P_M,t_d}(t_R, a_R, b_R)$.

$P_M$ is the set of parameters the measurement depends on outside of $t_R$, $a_R$, and $b_R$. In some examples, $P_M$ includes $P_S$, and $P_L$. Equation (6) can be rewritten as equation (7):

$$M_{P_M,t_d}(t_R, a_R, b_R) = a_R A_{P_M,t_d}(t_R) + b_R B_{P_M} \qquad (7)$$

Where $$A_{P_M,t_d}(t) = \int f_{P_L}(t') g_{P_S}(t - t_d + t') dt' \qquad (8)$$

$$B_{P_M} = \int g_{P_S}(t) dt \qquad (9)$$

The function $$A_{P_M,t_d}(t)$$

represents the contribution to the measurement from the light reflecting off the scene, while $B_{P_M}$ represents the contribution to the measurement from background light such as sunlight. Note that the functions $$A_{P_M,t_d}(t)$$

and $B_{P_M}$ do not depend on parameters of the scene such at $t_R$, $a_R$ and $b_R$.

Furthermore, when the equivalency shown in equation (4) is used:

$$A_{P_M}(t) \equiv A_{P_M,0}(t) \qquad (10)$$

Then $A_{P_M,t_d}(t)$ is defined by equation (11):

$$A_{P_M,t_d}(t) = A_{P_M}(t - t_d) \qquad (11)$$

Thus, the function $A_{P_M}(t)$ is determined and stored. $A_{P_M}(t)$ is the characteristic function of a measurement.

In various implementations, $A_{P_M}(t)$ and $B_{P_M}$ are computed before the time-of-flight measurement, during a calibration step. In some examples, due to the dependence of $A_{P_M}(t)$ and $B_{P_M}$ on the parameters $P_M$, a lookup table is stored that outputs the functions $A_{P_M}(t)$ and $B_{P_M}$ when given the measured values of $P_M$. In some implementations, a total measurement is made up a linear combination of measurements. For instance, measurements can be added or subtracted in hardware. In particular, differential measurements can be used. In some examples, measurements can be stored in a separate storage area, where a difference is calculated. The measurement can be denoted in the form $M_{P_M}$ where the set of parameters $P_M$ includes the description of the linear combination of measurements that lead to the final $M_{P_M}$.

In some implementations, measurements are selected to remove the background signal, and $B_{P_M}$ is not stored. In one example, the background signal is separately measured. For examples, the background signal can be measured separately by having a storage unit store a background signal measurement $M_{BG,PM}$ where $f_{P_L}(t) = 0$. The background signal measurement $M_{BG,PM}$ can be removed from the overall measurement, as shown in equation (12):

$$M_{P_M,t_d}(t_R, a_R, b_R) - M_{BG,PM} = a_R A_{P_M,t_d}(t_R) \qquad (12)$$

In such cases, only the function $A_{P_M}(t)$ is obtained during calibration. Alternatively, two measurements with different parameters can be used. For example, different values $t_{d_1}$ and $t_{d_2}$ of the delay time $t_d$ but with the same level of background light can be used. Then, the difference between $t_{d_1}$ and $t_{d_2}$ can be determined. In one example, the difference is determined by storing the two values independently and taking the difference. In another example, the difference is determined by a differential measurement directly in hardware. In either case, the resulting quantity is represented by equation (13):

$$M_{P_M,t_{d_1}}(t_R, a_R, b_R) - M_{P_M,t_{d_2}}(t_R, a_R, b_R) = \qquad (13)$$
$$a_R\left(A_{P_M,t_{d_1}}(t_R) - A_{P_M,t_{d_2}}(t_R)\right)$$

According to various features, the resulting quantity of equation (12) is relatively insensitive to background light. In general, any linear combination of measurements that has relatively little contribution from background light will be independent of $B_{P_M}$ and depend on a linear combination of functions $A_{P_M}(t_R - t_d)$. Thus, in some implementations, equation (12) is a new single measurement as shown in equation (14):

$$M_{P_M,t_{d_1},t_{d_2}}(t_R, a_R) = a_R A_{P_M,t_{d_1},t_{d_2}}(t_R) \qquad (14)$$

where $$M_{P_M,t_{d_1},t_{d_2}}(t_R, a_R) =$$
$$M_{P_M,t_{d_1}}(t_R, a_R, b_R) - M_{P_M,t_{d_2}}(t_R, a_R, b_R)$$

and $$A_{P_M, t_{d_1}, t_{d_2}}(t_R) = A_{P_M, t_{d_1}}(t_R) - A_{P_M, t_{d_2}}(t_R).$$

In some examples, the function $$A_{P_M, t_{d_1}, t_{d_2}}(t_R)$$

is precomputed. In general, $$M_X(t_R, a_R, b_R) = a_R A_X(t_R) \quad (15)$$

where X is the set of parameters that the measurement depends on, which does not include $a_R$, $t_R$ or $b_R$. For example, in equation (15), X={$P_M$, $t_{d_1}$, $t_{d_2}$}.

Figure 5:
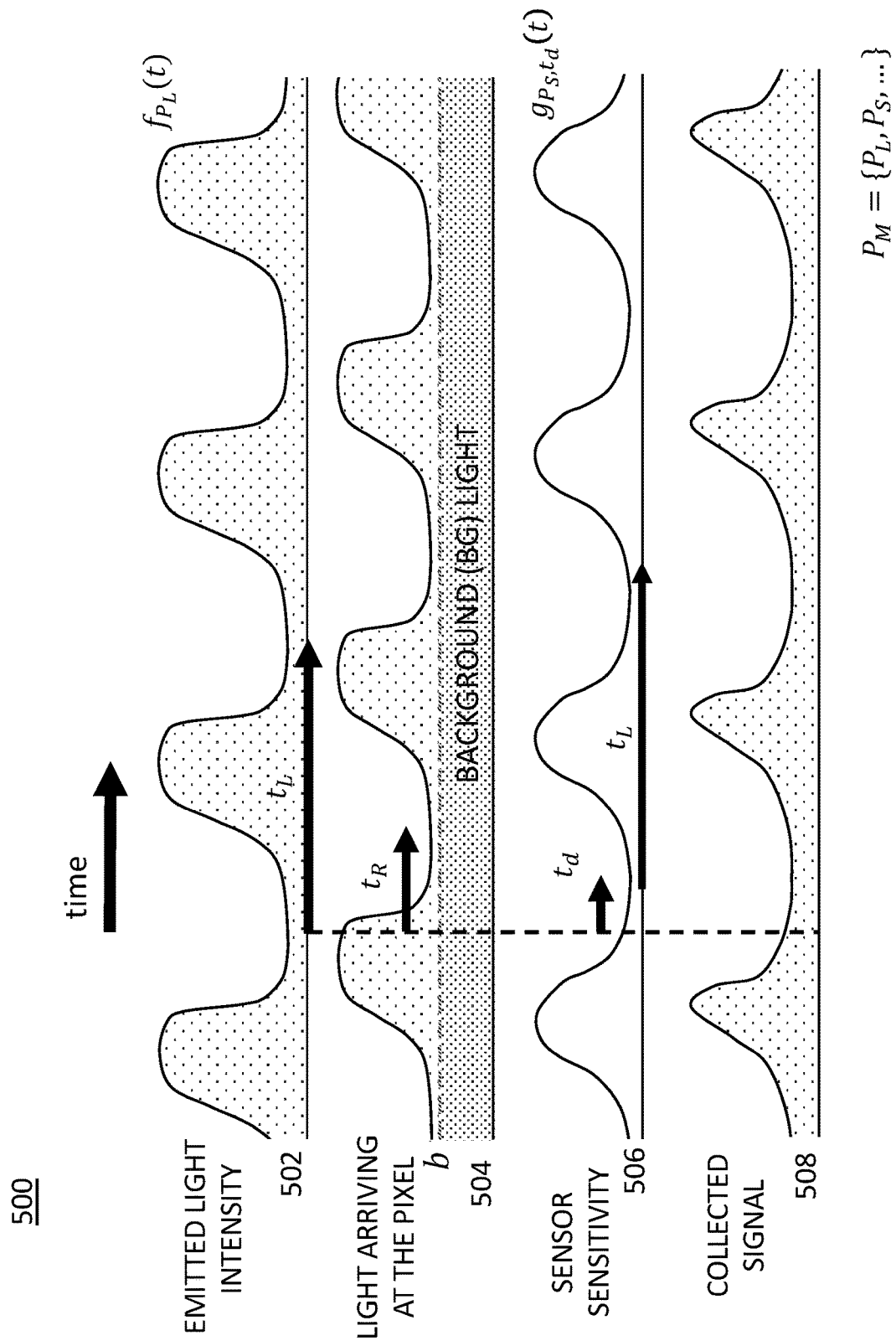
FIG. 5 depicts an example of a type of measurement in time-of-flight imagers using continuous wave operation, according to some embodiments of the disclosure.

FIG. 5 depicts another example of a type of measurement in time-of-flight imagers using continuous wave operation. In measurement 500, the light intensity 502 and sensor sensitivity 506 exhibit periodic behavior with period $t_L$, for a finite number of repetitions. In some examples, the light intensity $f_{P_L}(t)$ and the sensor sensitivity $g_{P_S, t_d}(t)$ does not decrease to zero. Thus, FIG. 5 shows an example of continuous wave operation. In contrast, FIG. 4 shows an example of pulsed operation. As shown in FIG. 5, the time of flight measurement is represented by equation (16):

$$M_{P_M, t_d}(t_R, a_R, b_R) = \int (a_R f_{P_L}(t - t_R) + b_R) g_{P_S, t_d}(t) dt \quad (16)$$

In some implementations, there may be multiple measurements simultaneously. In one example including multiple measurements, the hardware stores part of the collected signal in a first storage unit and part of the collected signal in a second storage unit. In one example, the difference between the signal in the first storage unit and the signal in the second storage unit is determined directly in hardware. In such both continuous wave and pulsed wave examples, when the sensor has approximately a linear response, the measurement in each storage unit can be written in the form of equation (7).

The equations above are based on an assumption that the light rays arriving at a pixel have predominantly travelled a time approximately equal to a travel time $t_R$. However, in some implementations, light rays arriving at a pixel have travelled a different travel time. Then, additional K paths with respective travel times $t_{R_i}$ are included in the distance determination. If the sensor response is linear, a signal measurement is the sum of the contributions from the K paths, as shown in equation (17):

$$M_{X, t_d} = \sum_{i=1}^{K} a_{R_i} A_X(t_{R_i} - t_d) \quad (17)$$

where the $a_{R_i}$ are proportional to the amount of light returning from each of the K paths.

In some examples, for continuous wave type measurements 500 with periodic function $A_X(t)$, the function $A_X(t)$ can be approximated as shown in equation (18):

$$A_X(t) = A_0(\cos(\omega t) + 1) \quad (18)$$

with frequency of the measurement $$\omega = \frac{2\pi}{t_L}$$

where $t_L$ is the period of the measurement, and where $A_0$ is a constant. One approach to obtaining measurements with such a function is to perform extra measurements that cancel out higher harmonics of the function $A_X(t)$. For example, Fourier decomposing the function $A_X(t)$ into Fourier modes, as shown in equation (19):

$$A_X(t) = \Sigma_j A_j(\cos(j\omega t + \phi_j) + 1) \quad (19)$$

where $A_j$ are the amplitudes, and $\phi_j$ the phases of each Fourier component. Then, taking the difference of measurements offset by half a period cancels all even harmonics, as shown in equation (20):

$$M_{P_M, t_d}(t_R, a_R, b_R) - M_{P_M, t_d + \frac{t_L}{2}}(t_R, a_R, b_R) = \quad (20)$$

$$a_R \sum_j 2 A_{2j+1} \cos(j\omega t + \phi_j)$$

Further measurements can be combined to cancel more harmonics, until equation (19) approximately holds.

In some implementations, $A_X(t)$ is approximated as having a single Fourier component as in equation (19). When $A_X(t)$ has a single Fourier component and all the measurements are carried out at fixed frequency ω, the multi-path problem may be unsolvable. This is because the sum of cosines of a same frequency is itself a cosine of the same frequency, and therefore the sum will behave as if there was a single path. One solution is to perform multiple measurements at different frequencies. Overall, if extra measurements are used to get a function $A_{P_M}(t)$ of the form $A_0(\cos(\omega t) + 1)$, and multiple measurements are determined at different frequencies to resolve multi-path problems, the total number of measurements can be quite large. Furthermore, the hardware is selected to be able to perform measurements at a set of frequencies that lead to solutions to the multi-path problem that are not too noisy according to a desired precision and accuracy.

Systems and methods are provided for a multi-path problem solution that does not rely on the functional form $A_{P_M}(t) = A_0(\cos(\omega t) + 1)$, and resolves multi-path measurements with far less power consumption and fewer measurements. The systems and methods provide a multi-path problem solution having higher frame rates, higher accuracy, and using simpler hardware. In some examples, the hardware does not require frequency shifts. Additionally, the systems and methods provide the ability to use a $A_{P_M}(t)$ that is a function determined by the hardware (as opposed to a specific functional form). Thus, the systems and methods simplify the hardware design without having to filter out higher harmonics of the output of the light sources, out without the time dependence of the sensor sensitivity. In some examples, hardware is designed that produces measurements that aid in accurate multi-path resolution.

According to various aspects, systems and methods are disclosed for including a time-of-flight imager and processor which resolves the multiple paths and outputs the multiple depths $D_i$ at each pixel.

In some implementations, a maximum likelihood estimation is chosen based on a noise model as a procedure for resolving the multiple paths. Since there are 2K+1 degrees of freedom $t_{R_i}$, $a_{R_i}$, $b_R$, at least 2K+1 measurements $$M_{P_{M_j}, t_{d_j}}$$

are used. More than 2K+1 measurements can be used to increase the robustness of the estimation.

In many situations the measurements are dominated by one or two paths. For example, if there is a nearby object, the pixel may receive light from internal reflection of light coming from the nearby object, and light from the object the pixel is pointing to. In that case there are 5 degrees of freedom.

A calibration step is first carried out before solving the estimation problem. During the calibration, the characteristic functions $$A_{P_{M_j}}(t)$$

as a function of t are obtained. In one example, a target is placed in front of the imager and moved to known distances $$D = \frac{ct}{2}.$$

The contribution from background light can be measured separately and subtracted. For a fixed target, the amplitude $a_R$ of the return signal decays with distance as $1/D^2$, and therefore $$A_{P_{M_i}}(t)$$

can be determined up to an unimportant overall factor.

Instead of moving a target, one can use the fact that $$A_{P_{M_i}, t_{d_i}}(t) = A_{P_{M_i}}(t - t_{d_i})$$

to simulate distance by changing $t_{d_i}$. Thus, in some examples, the characteristic functions $$A_{P_{M_i}}(t)$$

is obtained by having a single target at a fixed distance. Once the characteristic functions $$A_{P_{M_i}}(t)$$

as a function of t are known, the functions $$A_{P_{M_i}}(t)$$

are stored. Given a new set of time-of-flight measurements, the parameters $a_{R_i}$ and $t_{R_i}$ are estimated to maximize the likelihood of the time-of-flight measurements.

FIGS. 6A, 6B show two graphs demonstrating the multi-path problem for two paths, a first path 606 and a second path 608, according to various embodiments of the disclosure. FIG. 6A shows a graph illustrating an exemplary $A_{P_M}(t)$. As shown in FIG. 6B, there are six pulsed measurements 612a-612f: first pulsed measurement 612a $$M_{P_M, t_{d_1}},$$

second pulsed measurement 612b $$M_{P_M, t_{d_2}},$$

third pulsed measurement 612c $$M_{P_M, t_{d_3}},$$

fourth pulsed measurement 612d $$M_{P_M, t_{d_4}},$$

fifth pulsed measurement 612e $$M_{P_M, t_{d_5}},$$

and sixth pulsed measurement 612f $$M_{P_M, t_{d_6}}.$$

The $P_{M_i}$ are equal $P_{M_i} = P_M$, so that all the parameters except for the delays $t_{d_i}$ are the same for all measurements. FIG. 6B shows the resulting measurements $$M_{P_M, t_d}$$

as a function of the delay time $t_d$. Given the measurements $$M_{P_M, t_d},$$

the problem is to estimate the amplitudes $a_{R_1}$ of the first path 606 and $a_{R_2}$ of the second path 608 and the respective travel times $t_{R_1}, t_{R_2}$ for each of the measurements.

In particular, the amplitude $a_{R_1}$ of the first path 606 is used in calculating the measurement $a_{R_1} A_{P_M}(t - t_{R_1} + t_d)$ for the first path 606, as described above. The amplitude $a_{R_2}$ of the second path 608 is used in calculating the measurement $a_{R_2} A_{P_M}(t - t_{R_2} + t_d)$ for the second path 608, as described above. Thus, the overall measurement 610 of the received signal is the combination of the received signal measurements from the first path 606 and the second path 608, as shown in equation (21):

$$a_{R_1} A_{P_M}(t - t_{R_1} + t_d) + a_{R_2} A_{P_M}(t - t_{R_2} + t_d) \qquad (21)$$

Figure 7A:
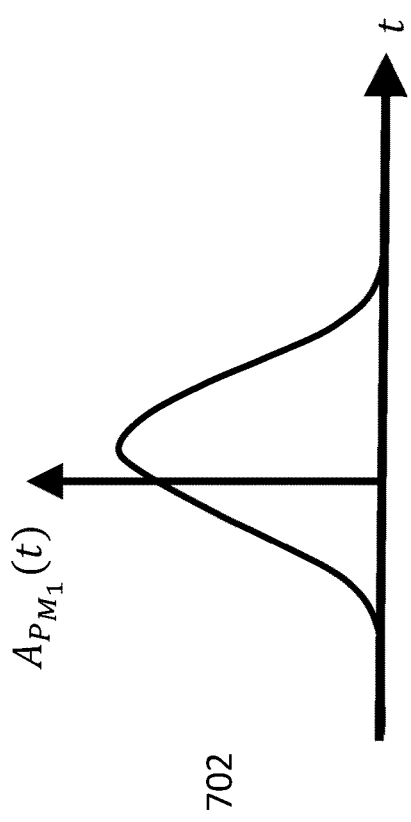
FIGS. 7A-7D each show a graph demonstrating an example of a multi-path problem, according to some embodiments of the disclosure.

FIGS. 7A-7D show four graphs demonstrating an example of a multi-path problem, according to various embodiments of the disclosure. FIG. 7A shows an example of a first characteristic function $$A_{P_{M_1}}(t).$$

Figure 7B:
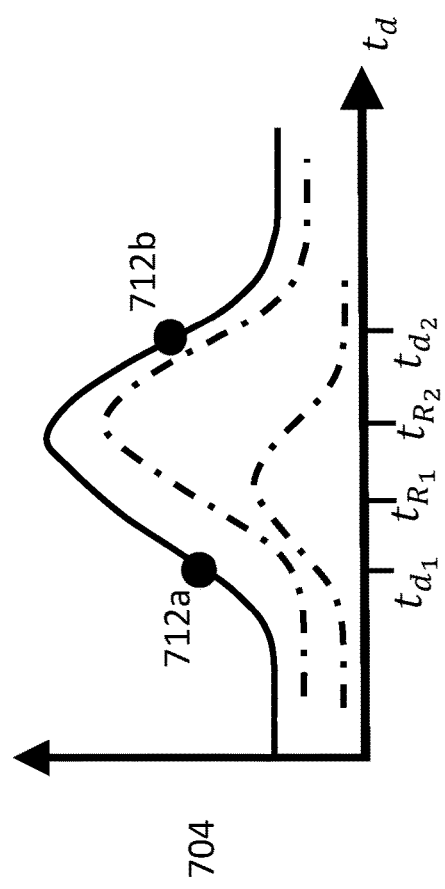

FIG. 7B is a graph 704 showing an example of the measurements as a function of delay $t_d$ for a pixel receiving light from two parts of objects, with respective travel times $t_{R_1}$ and $t_{R_2}$. In particular, the graph 704 shows a first measurement 712a $$M_{P_{M1},t_{d_1}}$$

at time $t_{d_1}$ and a second measurement 712b $$M_{P_{M1},t_{d_2}}$$

at time $t_{d_2}$. The two characteristic functions, shown dot-dashed in FIG. 7B, for respective travel times $t_{R_1}$ and $t_{R_2}$ multiplied by the amplitude of the two travel paths and added to give the solid line representing the possible measurements obtained by the imager. The first 712a and second 712b measurements shown in the second graph 704 in FIG. 7B have the same parameters $P_{M_1}$ as the characteristic function $$A_{P_{M_1}}$$

shown in the graph 702 of FIG. 7A. The measurement of the received signal shown in the second graph 704 of FIG. 7B is represented by equation (22):

$$a_{R_1}A_{P_{M_1}}(t - t_{R_1} + t_d) + a_{R_2}A_{P_{M_1}}(t - t_{R_2} + t_d) \quad (22)$$

Figure 7C:
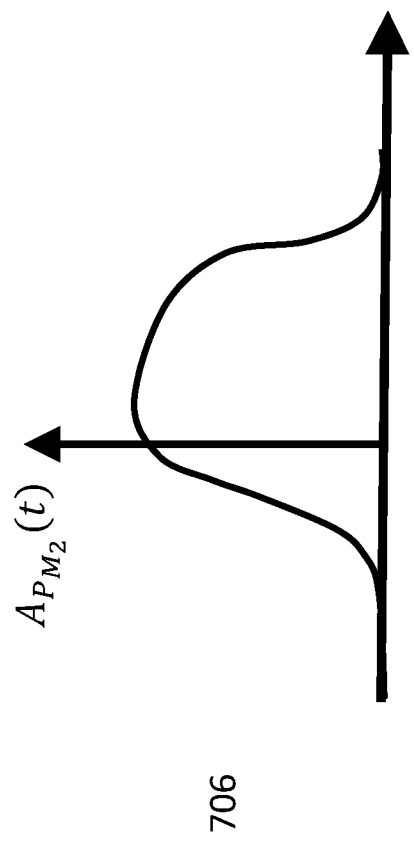

FIG. 7C is a third graph 706 showing a second example characteristic function $$A_{P_{M_2}}.$$

Figure 7D:
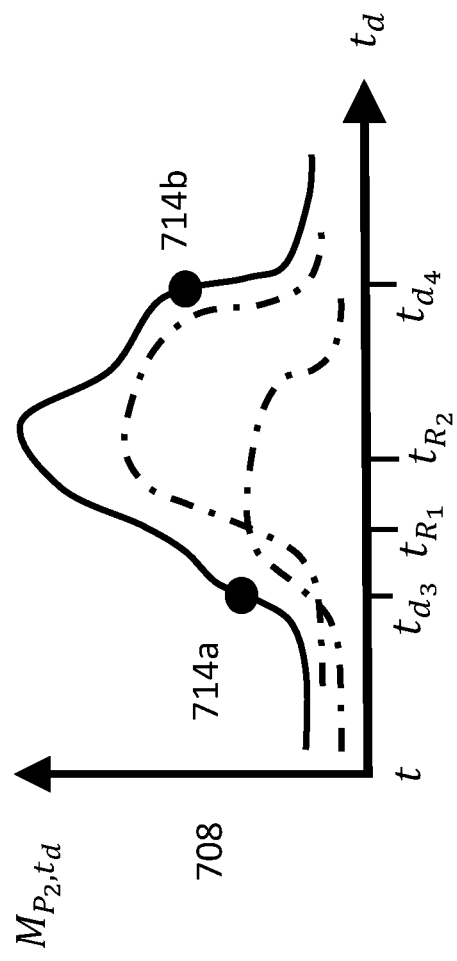

FIG. 7D is a fourth graph 708 showing two measurements as a function of $t_d$ for a pixel receiving light from travel times $t_{R_1}$ and $t_{R_2}$. In particular, the fourth graph shows a first measurement 714a $$M_{P_{M2},t_{d_3}}$$

at time $t_{d_3}$ and a second measurement 714b $$M_{P_{M2},t_{d_4}}$$

at time $t_{d_4}$. first 714a and second 714b measurements shown in the fourth graph 708 of FIG. 7D have the same parameters $P_{M_2}$ as the characteristic function $$A_{P_{M_2}}$$

shown in the third graph 706 of FIG. 7C. The graphs 706, 708 in FIGS. 7B and 7D each have two pulsed measurements, shown by the solid circles. Thus, the graphs 706, 708 in FIGS. 7B and 7D have four pulsed measurements, combined. The measurement of the received signal shown in the fourth graph 708 of FIG. 7D is represented by equation (23):

$$a_{R_1}A_{P_{M_2}}(t - t_{R_1} + t_d) + a_{R_2}A_{P_{M_2}}(t - t_{R_2} + t_d) \quad (23)$$

Figure 8A:
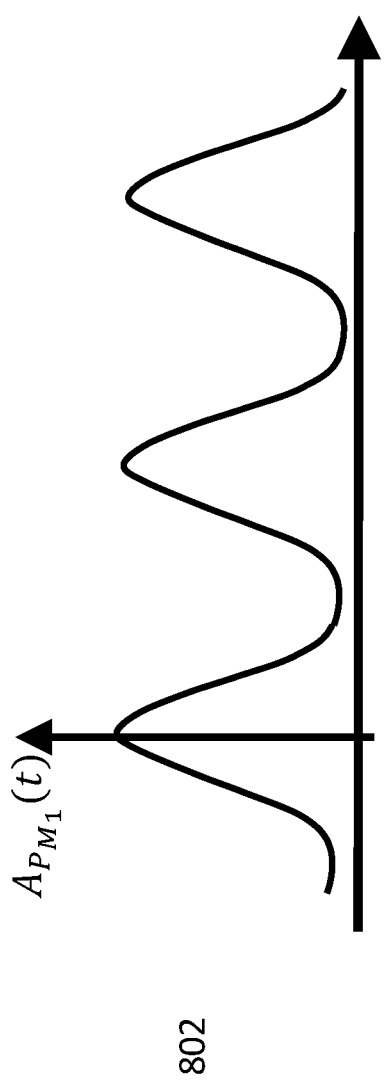
FIGS. 8A-8D each show a graph depicting an example of measurements from continuous wave signals, according to some embodiments of the disclosure.

FIGS. 8A-8D show four graphs depicting an example of measurements from continuous wave signals. FIG. 8A shows a first graph 802 showing a continuous wave signal $$A_{P_{M_1}}.$$

Figure 8B:
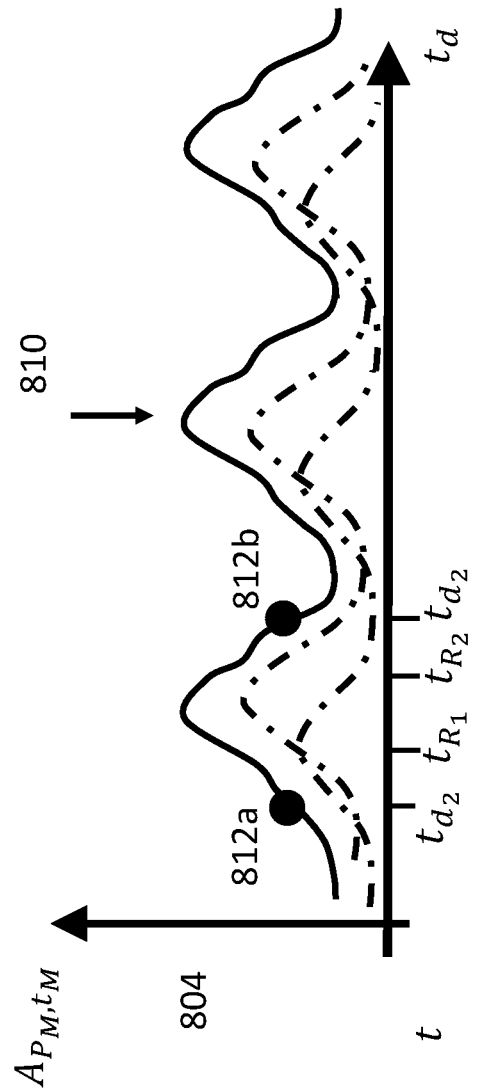

FIG. 8B shows a second graph 804 showing two measurements: a first measurement 812a $$M_{P_{M1},t_{d_1}}$$

at time $t_{d_1}$ and a second measurement 812b $$M_{P_{M1},t_{d_2}}$$

at time $t_{d_2}$. The measurements shown in FIG. 8B in the second graph 804 have the same parameters $P_{M_1}$ as the characteristic function $$A_{P_{M_1}}$$

shown in graph 802 of FIG. 8A. The measurement of the received signal 810 shown in the second graph 804 of FIG. 8B is represented by equation (24):

$$a_{R_1}A_{P_{M_1}}(t - t_{R_1} + t_d) + a_{R_2}A_{P_{M_1}}(t - t_{R_2} + t_d) \quad (24)$$

Figure 8C:
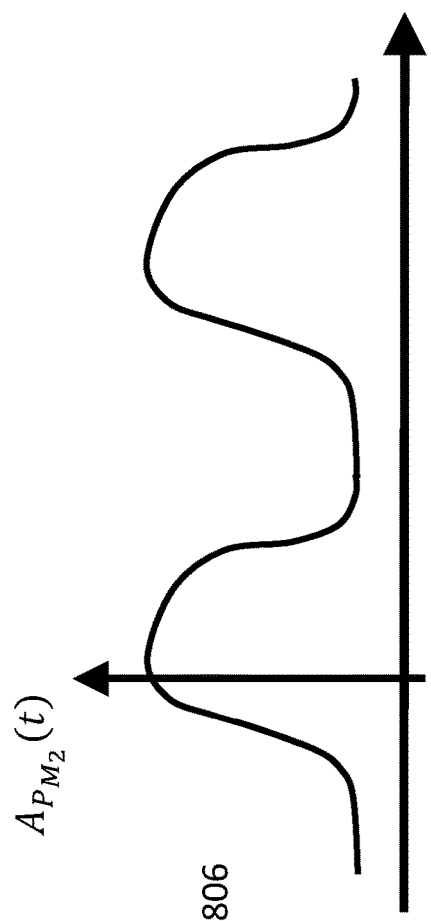

FIG. 8C shows a third graph 806 showing a second characteristic $$A_{P_{M_2}}.$$

Figure 8D:
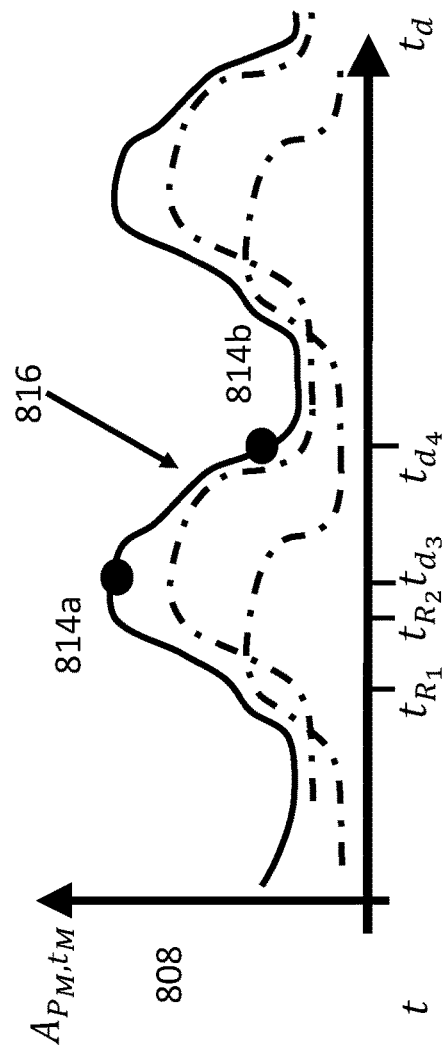

FIG. 8D shows a fourth graph 808 showing two measurements: a first measurement 814a $$M_{P_{M2},t_{d_3}}$$

at time $t_{d_3}$ and a second measurement 814*b*

$$M_{P_{M2},t_{d_4}}$$

at time $t_{d_4}$. The measurements shown in FIG. 8D in the fourth graph 808 have the same parameters $P_{M_2}$ as the characteristic function $$A_{P_{M_2}}$$

shown in graph 806 of FIG. 8C. The measurement of the received signal 816 shown in the fourth graph 808 of FIG. 8D is represented by equation (25):

$$a_{R_1} A_{P_{M_2}}(t - t_{R_1} + t_d) + a_{R_2} A_{P_{M_2}}(t - t_{R_2} + t_d) \quad (25)$$

In some implementations, the dominant noise source is shot noise. Shot noise derives at least in part from the quantum nature of light and therefore cannot be fully removed. Thus, in some examples, the sensors are dominated by shot noise. When shot noise dominates, each measurement $$M_{P_{M_j},t_{d_j}}$$

is proportional to a quantity distributed according to the Poisson distribution. The proportionality constant is denoted by α such that $$\frac{M_{P_{M_j},t_{d_j}}}{\alpha}$$

is Poisson distributed. Thus, the proportionality is denoted by equation (26):

$$y_{P_{M_j},t_{d_j}} = \frac{M_{P_{M_j},t_{d_j}}}{\alpha} \quad (26)$$

The mean value of $$y_{P_{M_j},t_{d_j}} \text{ is } \mu_{P_{M_j},t_{d_j}}.$$

For simplicity of notation, $$y_j = y_{P_{M_j},t_{d_j}} \text{ and } \mu_j = y_{P_{M_j},t_{d_j}}.$$

For a Poisson distributed measurement y with mean µ:

$$P(y) = \frac{\mu^y e^{-\mu}}{y!} \quad (27)$$

which has a standard deviation $\sigma_y = \sqrt{\mu}$.

For a series of independent measurements $y_i$ with means $\mu_i$, $$P(y_1, \ldots, y_N) = \Pi_{j=1}^{N} \frac{\mu_j^{y_j} e^{-\mu_j}}{y_j!} \quad (28)$$

A maximum likelihood estimate will obtain the $\mu_i$ that maximize $P(y_1, \ldots, y_N)$, or, equivalently, its logarithm:

$$\log(P(y_1, \ldots, y_N)) = \sum_{j=1}^{N} y_j \log(\mu_i) - \mu_i - \log(y_i!) \quad (29)$$

Equation (29) may be maximized with the parametric form $$\mu_j = \sum_{i=1}^{K} a_{R_i} A_{P_{M_j},t_{d_j}}(t_{R_i}) + b_R B_{P_{M_j},t_{d_j}} \quad (30)$$

where it is assumed the background level is the same for all measurements. If the background level varies among measurements, the measurements may each be multiplied by a constant to obtain the same background level.

If we assume measurements are of the type in equation (15) where the background contribution has been removed, then:

$$\mu_j = \sum_{i=1}^{K} a_{R_i} A_{P_{M_j},t_{d_j}}(t_{R_i}) \quad (31)$$

In one example, the goal is to find $a_{R_i}$ that maximize $\log(P(y_1, \ldots, y_N))$. The equation can be simplified by assuming $$\left| \frac{y_j}{\mu_j} - 1 \right| \ll 1,$$

which, given that $\sigma_{y_j} = \sqrt{\mu_j}$, has very high probability for µ large enough. Then:

$$\log(P(y_1, \ldots, y_N)) \simeq -\frac{1}{2} \sum_{j=1}^{N} \frac{(\mu_j - y_j)^2}{y_j} + \sum_{j=1}^{N} (y_j \log(y_j) - y_j) \quad (32)$$

Only the first term depends on the $\mu_i$ that is optimized over, therefore an equivalent problem is to minimize $$G(a_{R_1}, \ldots, a_{R_N}, t_{R_1}, \ldots, t_{R_N}) = \sum_{j=1}^{N} \frac{(\mu_j - y_j)^2}{y_j} \qquad (33)$$

where $\mu_j = \sum_{i=1}^{K} a_{R_i} A_{P_{M_j}, t_{d_j}}(t_{R_i})$.

This is similar to a least squares fitting but with $y_j$ as a denominator, which is a point estimate of the variance of $y_j$ because we assumed shot noise dominance. More generally:

$$G(a_{R_1}, \ldots, a_{R_N}, t_{R_1}, \ldots, t_{R_N}) = \sum_{j=1}^{N} \frac{(\mu_j - y_j)^2}{\sigma_{y_j}^2} \qquad (34)$$

where $\sigma_{y_j}^2$ is an estimate of the variance of $y_j$. For example, if the variance has a constant contribution c, from dark noise, background noise or thermal noise for example, as well as the shot noise, then $\sigma_{y_j}^2 = c + dy_j$, and:

$$G(a_{R_1}, \ldots, a_{R_N}, t_{R_1}, \ldots, t_{R_N}) = \sum_{j=1}^{N} \frac{(\mu_j - y_j)^2}{c + d\,y_j} \qquad (35)$$

In one example, if a reliable noise model is not available, c=1 and d=0 can be used, which is least squares fitting of the measurements:

$$G(a_{R_1}, \ldots, a_{R_N}, t_{R_1}, \ldots, t_{R_N}) = \sum_{j=1}^{N} (\mu_j - y_j)^2 \qquad (36)$$

The function $G(a_{R_1}, \ldots, a_{R_N}, t_{R_1}, \ldots, t_{R_N})$ from equation (34) depends quadratically on the quantities $a_{R_1}, \ldots, a_{R_N}$. At the minimum the derivative of G with respect to $a_{R_1}, \ldots, a_{R_N}$ is zero. Therefore, setting the derivatives with respect to $a_{R_1}, \ldots, a_{R_N}$ to zero gives N linear equations, which can be solved, thus leaving only the quantities $t_{R_1}, \ldots, t_{R_N}$ to minimize over.

Setting the derivative with respect to $a_{R_m}$ to zero gives:

$$\sum_j \frac{A_{P_{M_j}, t_{d_j}}(t_{R_m}) \left( \sum_{m'=1}^{K} a_{R_m'} A_{P_{M_j}, t_{d_j}}(t_{R_{m'}}) - y_j \right)}{\sigma_{y_j}^2} = 0 \qquad (37)$$

Defining the matrix $$F_{mm'} = \sum_j \frac{A_{P_{M_j}, t_{d_j}}(t_{R_m}) A_{P_{M_j}, t_{d_j}}(t_{R_{m'}})}{\sigma_{y_j}^2} \qquad (38)$$

$$g_m = \sum_j \frac{A_{P_{M_j}, t_{d_j}}(t_{R_m}) y_j}{\sigma_{y_j}^2} \qquad (39)$$

Equation (37) then becomes $$\sum_{m'} F_{mm'} a_{R_{m'}} = g_m \qquad (40)$$

When F is a symmetric matrix with components $F_{mm'}$, a is a vector with components $a_m$, and g a vector with components $g_m$, then (40) becomes $$F \cdot a_R = g \qquad (41)$$

which can be solved:

$$a_R = F^{-1} \cdot g \qquad (42)$$

where $F^{-1}$ is the inverse of the matrix F. Since F and g depend on $t_{R_1}, \ldots, t_{R_N}$, using $a_R = F^{-1} \cdot g$ we can write the $a_{R_m}(t_{R_1}, \ldots, t_{R_N})$ as functions of $t_{R_1}, \ldots, t_{R_N}$, thus removing them as variables. The optimization problem to minimize (34) becomes the problem of minimizing $$G(t_{R_1}, \ldots, t_{R_N}) = \sum_j \frac{\left( \sum_{m=1}^{K} a_{R_m}(t_{R_1}, \ldots, t_{R_N}) A_{P_{M_j}, t_{d_j}}(t_{R_m}) - y_j \right)^2}{\sigma_{y_j}^2} \qquad (43)$$

As previously discussed, in many situations the main contribution to each pixel is either from one path or two paths. In that case the solution to the problem is extremely fast as shown herein. In particular, equation (44):

$$G(t_{R_1}, t_{R_2}) = \Sigma_j \frac{\left( a_{R_1}(t_{R_1}, t_{R_2}) A_{P_{M_j}, t_{d_j}}(t_{R_1}) + a_{R_2}(t_{R_1}, t_{R_2}) A_{P_{M_j}, d_j}(t_{R_2}) - y_j \right)^2}{\sigma_{y_j}^2} \qquad (44)$$

In this case, F in equation (23) is a 2×2 matrix, and the inverse can be obtained exactly, as shown in equation (45)

$$F = \begin{pmatrix} F_{11} & F_{12} \\ F_{12} & F_{22} \end{pmatrix} \rightarrow F^{-1} = \frac{1}{F_{11}F_{22} - F_{12}^2} \begin{pmatrix} F_{22} & -F_{12} \\ -F_{12} & F_{11} \end{pmatrix} \qquad (45)$$

It can be assumed without loss of generality that $t_{R_1} \leq t_{R_2}$.

In some cases, further simplification can be obtained. For example, if the main problem is objects nearby to the camera giving a large signal that undergoes internal reflection in the lens and affects all or most of the pixels, then the distance to one of the objects is the same. Therefore, it can be assumed $t_{R_1}$ is the same across all pixels. In such a case $G(t_{R_1}, t_{R_2})$ is first minimized over $t_{R_1}$ and $t_{R_2}$, using, for example, grid search or Newton Raphson minimization, for a subset of all pixels. Assuming the corrupting object responsible for internal reflection is the closest object in the scene, the $t_{R_1}$ are averaged over the subset of pixels, and the average is set as $t_{R_1}$. For the other pixels, a one-dimensional minimization over $t_{R_2}$ is performed. One-dimensional minimization can be accelerated, for example as a rough grid search with subsequent Newton Raphson refinement. A one-dimensional minimization for each pixel is then feasible, even for approximately 500,000 pixels at 30 frames per second (fps), which would be the case for a sensor with VGA resolution.

A system operating at 30 fps for VGA or close to VGA resolution is desirable as modern time-of-flight sensors have resolution of 30 fps and 500,000 pixels.

In various implementations, systems and methods are provided that have operate at more than 30 frames per second. In the case of two paths, there are four free parameters: $a_{R_1}$, $a_{R_2}$, $t_{R_1}$, $t_{R_2}$, so the minimum number of measurements is four. More measurements can be used to reduce the noise and increase the accuracy of the estimates. However, in cases where there is a set of four measurements $M_i$, i=1, ..., 4, that provide sufficient accuracy, since the distances do not depend on the amount of output light, each $M_i$ can be divided by the largest of the $M_i$. Then there are only three degrees of freedom left, and also keeping track of which of the $M_i$ was the largest. Since there are only three parameters, the solution to the optimization problem above can be precomputed for a discrete set of values of $M_i$, and the precomputed solutions can be stored in a lookup table. Since each of the $M_i$ was divided by the largest of the $M_i$, all the $M_i$ will be between 0 and 1. Discretization can be done according to some discretization number $N_d$. Thus, for example, if $M_2$ is the largest, the measurement equations (46) are:

$$M_1 = \frac{j_1}{N_d}, M_2 = 1, M_3 = \frac{j_3}{N_d}, M_4 = \frac{j_4}{N_d}; j_1, j_3, j_4 = 1, \ldots, N_d \quad (46)$$

The input to a lookup table is $j_1, j_3, j_4$, and the associated $t_{R_1}, t_{R_2}$, are stored. The associated $t_{R_1}, t_{R_2}$ are obtained from solving offline the optimization problem above with equation (47):

$$(M_1, M_2, M_3, M_4) = \left(\frac{j_1}{N_d}, 1, \frac{j_3}{N_d}, \frac{j_4}{N_d}\right) \quad (47)$$

Another lookup table can be consulted for the case when $M_1$ is the largest measurement, another lookup table for when $M_3$ is the largest measurement, and a final look up table for when $M_4$ is the largest measurement.

Each lookup table includes $N_d^3$ entries. Since four lookup tables are included, the total number of entries is $4N_d^3$. In one example, the discretization number $N_d$=100. Thus, each lookup table includes one million entries, and four look-up tables total four million entries. Four million entries can easily fit in modern memory systems, such as random access memory (RAM) hardware.

Figure 9:
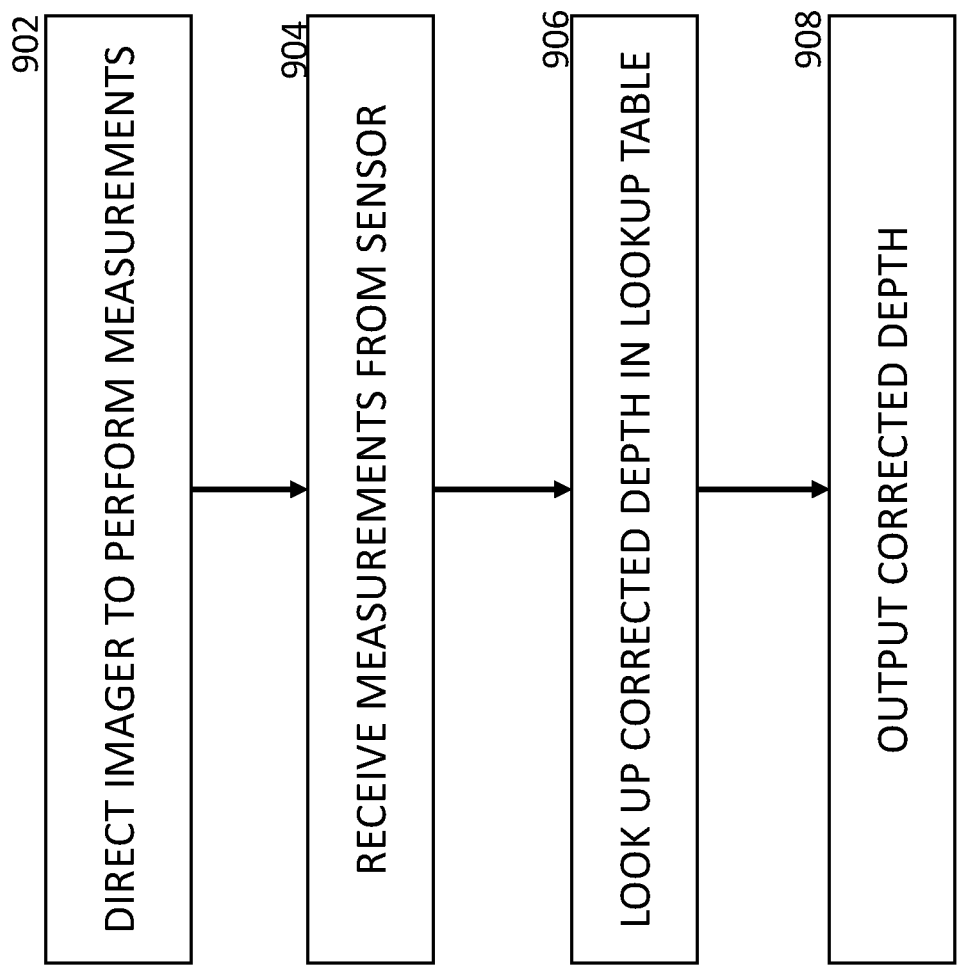
FIG. 9 shows a method for accessing elements of a lookup table, according to some embodiments of the disclosure.

Accessing elements of a lookup table is extremely fast, which allows, for example, operating at 30 frames per seconds with hundreds of thousands of pixels. FIG. 9 is a flow chart of a method performed by a processor. At step 902, the imager performs the measurements, as described above. This includes time of flight measurements for one or more paths. At step 904, the processor reads in the measurements from the imager. In particular, the processor receives input measurements from the imager. In one example, there are four measurements per pixel, and the processor performs discretization on the measurements as described above. At step 906, the processor feeds the discretized measurements into the lookup table and reads out the corrected depth. At step 908, the corrected depth is output from the processor.

In various examples, the lookup table also stores more information. In one example, the lookup table includes information about whether there is a significant contribution from paths other than the main path. If there is a significant contribution from paths other than the main path, the system acts as a multi-path detector.

More generally, the lookup table approach with M measurements includes $M \times N_d^{M-1}$ entries. Depending on the necessary discretization to get reasonable accuracy, a lookup table with $M \times N_d^{M-1}$ entries may allow for more than four measurements per pixel. In some examples, the lookup table is used to get a rough estimate of $t_{R_1}$ and $t_{R_2}$ and further refine the estimates. For example, a rough estimate can be used as a detector of multi-path corruption. In particular, during the estimation the amplitudes $a_{R_1}$ and $a_{R_2}$ of the two paths are obtained. If the ratio of the smallest to the largest of the amplitudes is below a selected threshold, for example below 1%, then it can be determined that multi-path effects are negligible for that pixel. In some examples, the lookup table can store an output value or zero if the ratio falls below a threshold, meaning that there is no multi-path corruption and the measurement can be trusted. Similarly, the lookup table can store an output value of one if there is significant multi-path corruption.

In some implementations, more measurements are used than can be stored in a lookup table that fits in available memory. In one example, a given desired accuracy for a two-path measurement uses more than four measurements, and the possible results do not fit in available memory. In one example, ten measurements are used. In some examples, too many measurements are made to fit all the possible results into a lookup table, and dimensionality reduction can be used to fit the solution to the two-path problem in a lookup table. For example, multi-path situations can be simulated by positing the presence of objects at certain distances. At each run, the simulation changes the distances to the objects, the simulation changes the reflectivities of the objects, and the simulation adds noise according to a noise model that reflects dominant noise sources in the setup.

In another implementation, objects are set up at known distances and the measurements are obtained with the actual camera. The resulting measurements are collected and dimensionality reduction is performed on the set of measurements. If the measurements in one setup are considered a vector, then the data collection leads to obtaining a set of vectors. One example algorithm for dimensionality reduction is Principal Component Analysis, which finds vectors that contribute most to reconstructing the collected measurement vectors. A number of most important principles measurement vectors can be stored, for example four principle measurement vectors, and a new measurement can be projected onto the measurement vectors. The coefficients of the projections can then be fed into a lookup table, wherein the lookup table dimensionality matches the number of measurement vectors that are stored.

In another implementation, dimensionality reduction can be achieved by writing sweep functions as a set of Fourier components. Some embodiments of time-of-flight cameras use relatively few Fourier components. For example, only a few Fourier components are used when only a few Fourier components are large enough to be non-negligible. In some examples, measurements are combined to reduce the number of Fourier components. For example, as described above, the difference of two continuous wave measurements offset by a delay time equal to half the period, $$M_{X,t_d} - M_{X,t_d+\frac{t_F}{2}},$$

cancels all even harmonics. If the function $A_X$ only has Fourier components at a few frequencies that are non-negligible, then as multi-path effects sum up $\Sigma_i a_{R_i} A_X(t_{R_i})$, the measurement will have non-zero Fourier components at the same frequencies. This is because the sum of cosines with a given frequency but different amplitudes and delays will also be a cosine of the same frequency. There are two real numbers to describe a Fourier component: amplitude and phase. The problem of determining depths is insensitive to multiplying all measurements by a constant. Therefore, when, for example, only two frequency components are sizeable, the components can be divided by the largest amplitude, which leaves three parameters.

Figure 10:
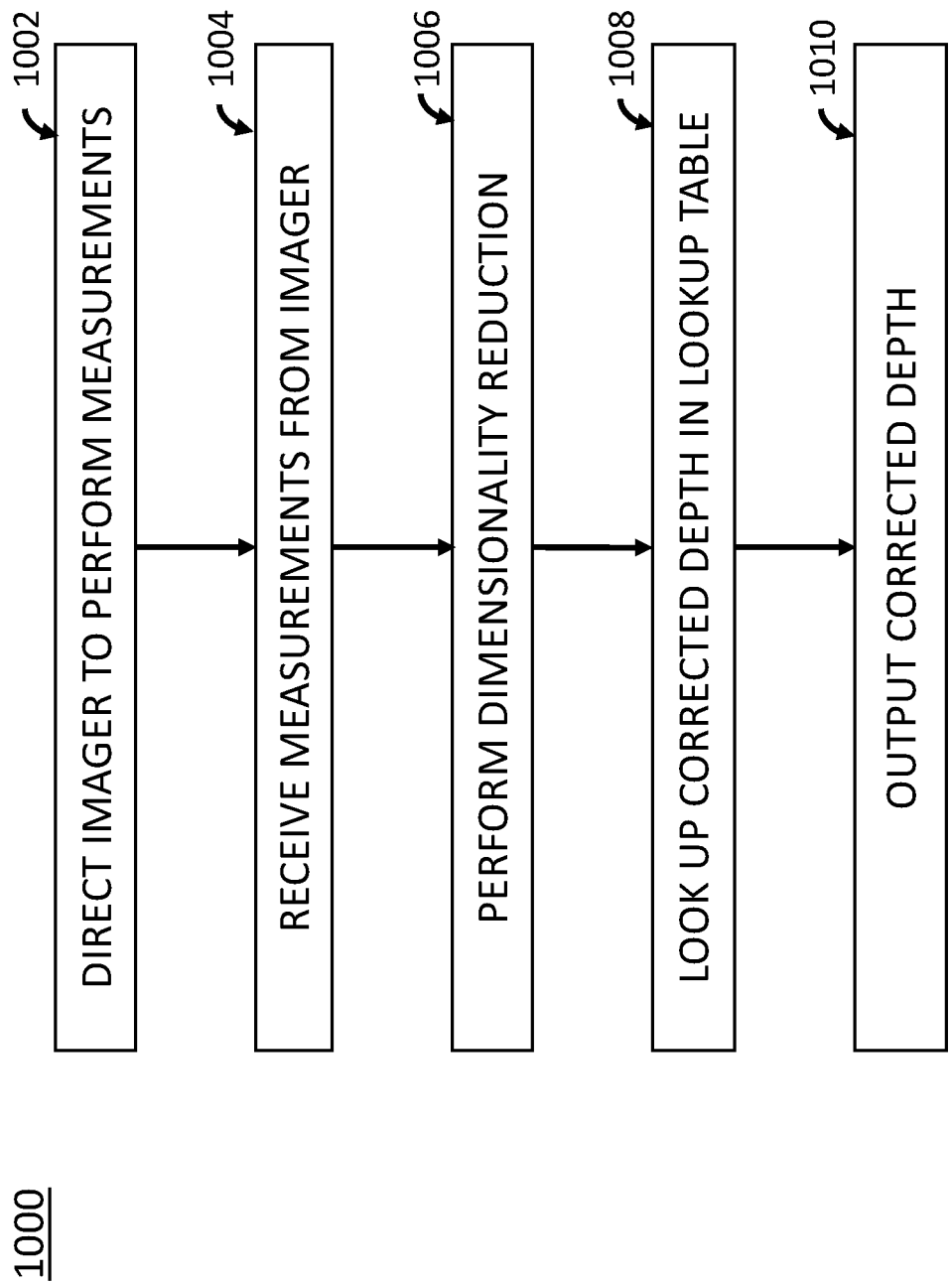
FIG. 10 shows a method for determining a corrected depth measurement, according to some embodiments of the disclosure.
Figure 11:
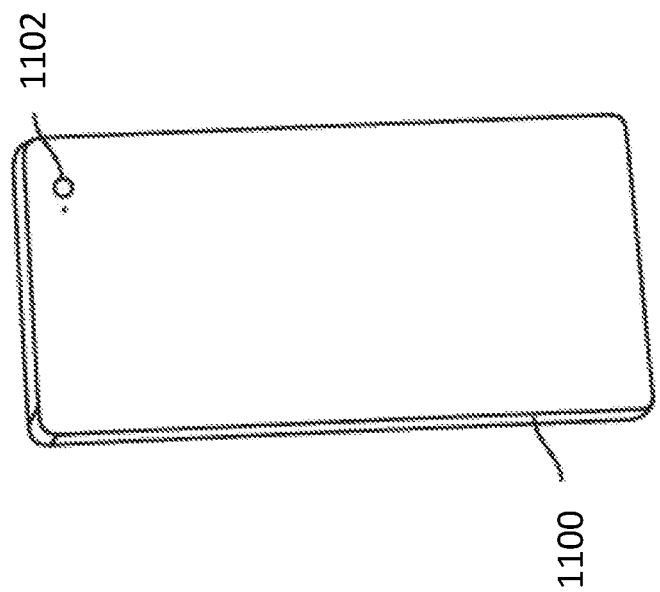
FIG. 11 illustrates a mobile device incorporating an imaging device of the types described herein.
Figure 12:
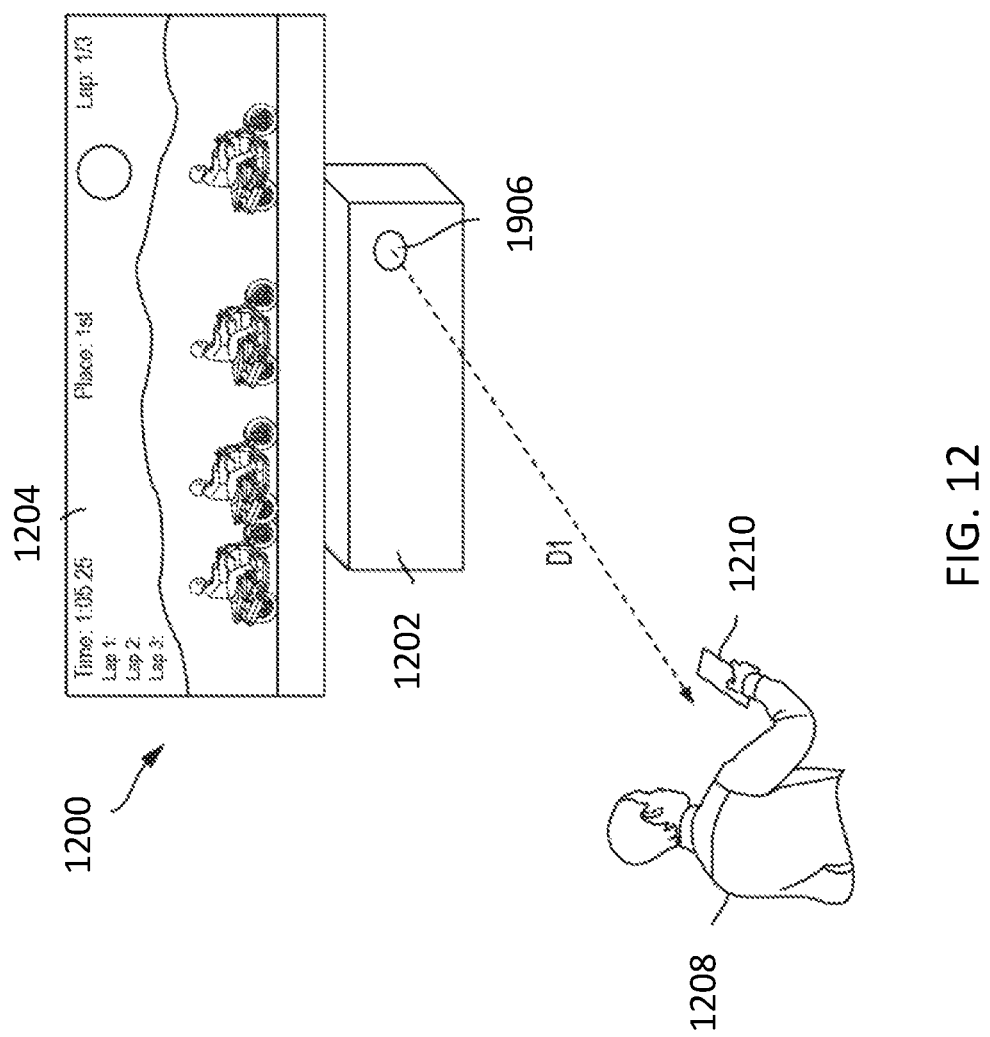
FIG. 12 illustrates a gaming console incorporating an imaging device of the types described herein.
Figure 13:
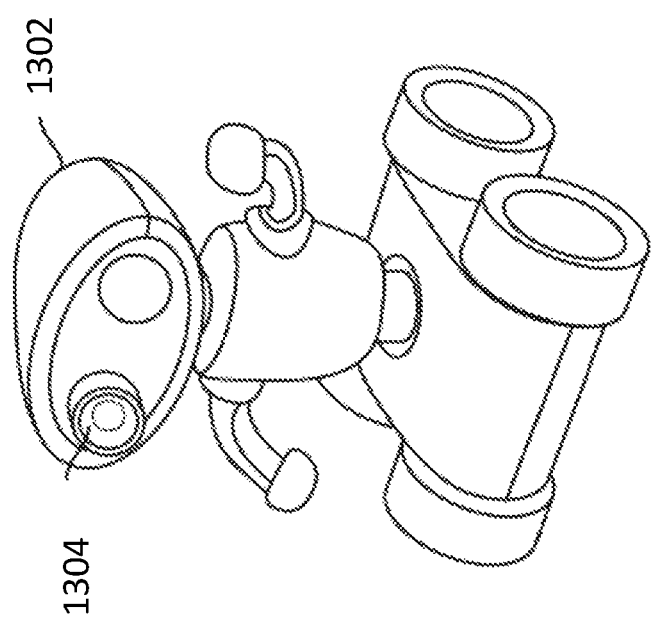
FIG. 13 illustrates a robot incorporating an imaging device of the types described herein.

A lookup table can be stored to do the computations offline. FIG. 10 is a flow chart of a method 1000 of determining a corrected depth measurement and resolving a multipath corruption. In some examples, a processor performs the steps in the method 1000. At step 1002, the processor directs the imager to perform measurements. In particular, the imager receives reflected emitted signals and measures time of flight. In various examples, a sensor array in the imager receives the signals. At step 1004, the processor receives measurements from the imager. At step 1006, the processor performs dimensionality reduction on the measurements as described in detail above. Dimensionality reduction reduces the number of measurements. At step 1008, the processor looks up the corrected depth in the lookup table using the dimensionally reduced values. At step 1010, the processor outputs the corrected depth.

SELECT EXAMPLES

Example 1 provides an image processing system for resolving multi-path corruption including a light source configured to emit a nonsinusoidal light signal during a first time interval, an image sensor comprising a plurality of pixels, the image sensor configured to collect incoming signals including a first reflected nonsinusoidal light signal and a second reflected nonsinusoidal light signal, and a processor. The processor is configured to determine a first estimated distance to an object based on the first and second reflected nonsinusoidal light signals, and determine a corrected distance using a look-up table.

Example 2 provides an image processing system according to example 1, where the image sensor is further configured to calculate a first set of measurements of the first and second reflected nonsinusoidal light signals.

Example 3 provides an image processing system according to examples 1-2, where the processor receives the first set of measurements from the imager and processes the first set of measurements to determine a second set of measurements, wherein the second set of measurements is smaller than the first set of measurements.

Example 4 provides an image processing system according to examples 1-3, where the processor performs dimensionality reduction on the first set of measurements to generate the second set of measurements.

Example 5 provides an image processing system according to any one of the preceding examples, the processor performs discretization on the first set of measurements to generate the second set of measurements.

Example 6 provides an image processing system according to any one of the preceding examples, where discretization includes selecting a discrete set of values from the first set of measurements, and wherein the look-up table stores precomputed solutions to the discrete set of values.

Example 7 provides an image processing system according to any one of the preceding examples, where the look-up table comprises stored corrected depth data for respective subsets of the first set of measurements.

Example 8 provides an image processing system according to any one of the preceding examples, where the processor is further configured to undergo a calibration step.

Example 9 provides a method for depth determination in an image to resolve multi-path corruption including emitting a nonsinusoidal light signal from a light source during a first time interval, receiving first and second reflected nonsinusoidal light signals at an imager array, performing time of flight measurements on the first and second nonsinusoidal light signals to generate a first set of measurements, receiving the first set of measurements at a processor, determining, at the processor, a first estimated distance to an object based on the first set of measurements, and determining a corrected distance based on the first set of measurements using a lookup table.

Example 10 provides a method according to example 9, including generating a second set of measurements using the first set of measurements, wherein the second set of measurements is smaller than the first set of measurements.

Example 11 provides a method according to any one of the preceding examples, including performing dimensionality reduction on the first set of measurements to generate the second set of measurements.

Example 12 provides a method according to any one of the preceding examples, including discretizing the first set of measurements to generate the second set of measurements.

Example 13 provides a method according to any one of the preceding examples, where discretizing the first set of measurements comprises selecting a discrete set of values from the first set of measurements, and wherein the look-up table comprises stored precomputed solutions for the discrete set of values.

Example 14 provides a method according to any one of the preceding examples, where the look-up table comprises stored corrected depth data for respective subsets of the first set of measurements.

Example 15 provides a method according to any one of the preceding examples, including calibrating processor distance measurements.

Example 16 provides an imaging apparatus for resolving multi-path corruption, including a light source configured to emit a nonsinusoidal light signal during a first time interval, an image sensor comprising a plurality of pixels, the image sensor configured to collect incoming signals including a first reflected nonsinusoidal light signal and a second reflected nonsinusoidal light signal, means for determining a first estimated distance to an object based on the first and second reflected nonsinusoidal light signals, and means for determining a corrected distance using a look-up table.

Example 17 provides an imaging apparatus for resolving multi-path corruption according to example 16 including means for generating a first set of measurements of the first and second reflected nonsinusoidal light signals.

Example 18 provides an imaging apparatus for resolving multi-path corruption according to examples 16-17 including means for processing the first set of measurements to determine a second set of measurements, wherein the second set of measurements is smaller than the first set of measurements.

Example 19 provides an imaging apparatus for resolving multi-path corruption according to examples 16-18 where processing the first set of measurements to determine a second set of measurements includes performing dimensionality reduction on the first set of measurements to generate the second set of measurements.

Example 20 provides an imaging apparatus for resolving multi-path corruption according to any of the preceding examples, where processing the first set of measurements to determine a second set of measurements includes performing discretization on the first set of measurements to generate the second set of measurements.

While aspects of the present disclosure may be used in any suitable imaging device, in some implementations, the aspects are applied within imaging devices that capture light during a plurality of frames, such as in video capture. Some imaging devices may be configured to ultimately preserve a single image yet may capture images a number of times prior to and/or after the image device has been activated to preserve the single image (e.g., devices configured to display a scene prior to capture of a single image for purposes of previewing the still image, and/or devices configured to capture a plurality of images when activated to capture a single image so that a single image can be selected and/or synthesized from the plurality of images). For the purposes of the discussion herein, a "frame" is considered to be applicable to both image capture during: (i) video capture; and (ii) still image capture where multiple images are registered in a device during the still image capture process (including, but not limited to, those examples above).

Following below are more detailed descriptions of various concepts related to, and embodiments of, techniques of distance sensing. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

The phrase "and/or," as used herein in the specification and in the claims, should be understood to mean "either or both" of the elements so conjoined, i.e., elements that are conjunctively present in some cases and disjunctively present in other cases. The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In embodiments, the imaging device can take measurements from a scene using the imaging sensor. The term "measurements" can include capturing two-dimensional images and depth images (e.g., depth information that can be used to construct a depth map). The term "two dimensional images" includes any images that are not depth images, such as color (RGB) images, greyscale images, infrared images, other conventional images, etc.

Various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) or a computer readable storage device (which may include the foregoing examples) encoded with one or more programs that, when executed on one or more computers or other processors, implement some of the various embodiments of the present application.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the examples and any claims, as well as in the specification above, all transitional phrases such as "comprising," "including," "carrying," "having," "containing," "involving," "holding," "composed of," and the like are to be open-ended, i.e., to mean including but not limited to. The transitional phrases "consisting of" and "consisting essentially of" shall be closed or semi-closed transitional phrases, respectively.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods. In this respect, various inventive concepts may be embodied as a computer readable storage medium or multiple computer readable storage media (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the examples, as well as any claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. An image processing system comprising:
 a light source configured to emit a nonsinusoidal light signal during a first time interval;
 an image sensor comprising a plurality of pixels, the image sensor configured to:
  collect incoming nonsinusoidal light signals responsive to the nonsinusoidal light signal, the incoming nonsinusoidal light signals including a first reflected nonsinusoidal light signal along a first path and a second reflected nonsinusoidal light signal along a second path; and
  generate a first set of measurements of the first reflected nonsinusoidal light signal along the first path and the second reflected nonsinusoidal light signal along the second path; and
 a processor configured to:
  receive the first set of measurements from the image sensor;
  determine a first estimated distance to an object based on the first set of measurements, and
  determine, based on the first set of measurements, a corrected distance to the object using a look-up table.

2. The image processing system of claim 1, wherein the processor is further configured to process the first set of measurements to determine a second set of measurements, wherein the second set of measurements is smaller than the first set of measurements.

3. The image processing system of claim 2, wherein the processor is further configured to perform dimensionality reduction on the first set of measurements to generate the second set of measurements.

4. The image processing system of claim 2, wherein the processor is further configured to perform discretization on the first set of measurements to generate the second set of measurements.

5. The image processing system of claim 4, wherein performing the discretization comprises selecting a discrete set of values from the first set of measurements, and wherein the look-up table comprises precomputed solutions for the discrete set of values.

6. The image processing system of claim 1, wherein the look-up table comprises first corrected depth data for a first subset of the first set of measurements and second corrected depth data for a second subset of the first set of measurements.

7. The image processing system of claim 1, wherein the processor is further configured to undergo a calibration step.

8. A method, comprising:
 emitting a nonsinusoidal light signal from a light source during a first time interval;
 receiving, at an imager array, in response to the nonsinusoidal light signal, incoming nonsinusoidal light signals including a first reflected nonsinusoidal light signal along a first path and a second reflected nonsinusoidal light signal along a second path;
 performing time of flight measurements on the first reflected nonsinusoidal light signal and the second reflected nonsinusoidal light signal to generate a first set of measurements;
 receiving the first set of measurements at a processor;
 determining, at the processor, a first estimated distance to an object based on the first set of measurements; and
 determining a corrected distance to the object based on the first set of measurements using a look-up table.

9. The method of claim 8, further comprising generating a second set of measurements using the first set of measurements, wherein the second set of measurements is smaller than the first set of measurements.

10. The method of claim 9, further comprising performing dimensionality reduction on the first set of measurements to generate the second set of measurements.

11. The method of claim 9, further comprising discretizing the first set of measurements to generate the second set of measurements.

12. The method of claim 11, wherein discretizing the first set of measurements comprises selecting a discrete set of values from the first set of measurements, and wherein the look-up table comprises stored precomputed solutions for the discrete set of values.

13. The method of claim 8, wherein the look-up table comprises first stored corrected depth data for a first subset of the first set of measurements and second stored corrected depth data for a second subset of the first set of measurements.

14. The method of claim 8, further comprising calibrating processor distance measurements.

15. An imaging apparatus, comprising:
 means for emitting a nonsinusoidal light signal during a first time interval;
 means for collecting incoming nonsinusoidal light signals responsive to the nonsinusoidal light signal, the incoming nonsinusoidal light signals including a first reflected nonsinusoidal light signal along a first path and a second reflected nonsinusoidal light signal along a second path;
 means for generating a first set of measurements of the first reflected nonsinusoidal light signal along the first path and the second reflected nonsinusoidal light signal along the second path;
 means for determining a first estimated distance to an object based on the first set of measurements; and
 means for determining, based on the first set of measurements, a corrected distance to the object using a look-up table.

16. The imaging apparatus of claim 15, further comprising means for processing the first set of measurements to determine a second set of measurements, wherein the second set of measurements is smaller than the first set of measurements.

17. The imaging apparatus of claim 16, wherein processing the first set of measurements to determine the second set of measurements includes performing dimensionality reduction on the first set of measurements to generate the second set of measurements.

18. The imaging apparatus of claim 16, wherein processing the first set of measurements to determine the second set of measurements includes performing discretization on the first set of measurements to generate the second set of measurements.

* * * * *